United States Patent
Masuda et al.

(10) Patent No.: US 6,765,543 B1
(45) Date of Patent: Jul. 20, 2004

(54) DISPLAY

(75) Inventors: Kozo Masuda, Yokohama (JP); Ikuya Arai, Yokohama (JP); Ren Imaoka, Yokohama (JP); Kazufumi Kikuchi, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/554,440

(22) PCT Filed: Oct. 28, 1998

(86) PCT No.: PCT/JP98/04882

§ 371 (c)(1),
(2), (4) Date: Jul. 14, 2000

(87) PCT Pub. No.: WO99/26131

PCT Pub. Date: May 27, 1999

(30) Foreign Application Priority Data

Nov. 13, 1997 (JP) .............................. 9-311739

(51) Int. Cl.⁷ ................................................ G09G 5/00
(52) U.S. Cl. ........................ 345/1.1; 345/156; 345/213; 710/8
(58) Field of Search ................................ 345/156, 157, 345/168, 163, 1.1, 3.1, 698, 699, 520, 700, 210, 211, 213; 710/8, 12, 15, 16

(56) References Cited

U.S. PATENT DOCUMENTS

| | | | | |
|---|---|---|---|---|
| 5,113,497 A | * | 5/1992 | Dewa | 710/16 |
| 5,257,350 A | * | 10/1993 | Howard et al. | 345/501 |
| 5,276,458 A | * | 1/1994 | Sawdon | 345/698 |
| 5,619,226 A | | 4/1997 | Cahill, III | |
| 5,675,813 A | * | 10/1997 | Holmdahl | 713/310 |
| 5,884,086 A | * | 3/1999 | Amoni et al. | 713/300 |
| 2001/0004257 A1 | * | 6/2001 | Nitta et al. | 345/211 |
| 2003/0005272 A1 | * | 1/2003 | Nalawadi et al. | 713/1 |

FOREIGN PATENT DOCUMENTS

EP  0 456 923 A1  11/1991
JP  9-6479  1/1997

OTHER PUBLICATIONS

"USB (Universal Serial Bus)", Interface, Jan. 97, pp. 108–110 (translation).
"Apple Vision 850", ASCII, vol. 21, No. 7, Jul. 97, pp. 412 (translation).

* cited by examiner

Primary Examiner—Xiao Wu
(74) Attorney, Agent, or Firm—Antonelli, Terry, Stout & Kraus, LLP

(57) ABSTRACT

A display unit is provided wherein a serial interface adapter (2) is provided between a PC (3) and a CPU (10) provided within the display unit and which is capable of performing mutual conversion between communication information compliant with interface specifications of the PC (3) and a display. The display unit is capable of communicating with various computers through the serial interface adapter (2). Further, the serial interface adapter (2) is removably provided and placed in a front panel of the display. The serial interface adapter (2) takes such a configuration as to be easily replaced by another according to the interface specifications of the PC.

26 Claims, 17 Drawing Sheets

DISPLAY

TECHNICAL FIELD

The present invention relates to a display unit which serves as an image display unit employed in a computer terminal or the like and has the function of communicating with computers such as a personal computer (hereinafter abbreviated as PC), a work station, etc.

BACKGROUND ART

As a conventional example of a display unit, which is related to communications with PC, may be mentioned an image display unit clearly shown in FIG. 7 in Japanese Patent Application Laid-Open No. Hei 5-232918. In this type of image display unit, a control signal based on interface specifications of a computer, which is outputted from a computer body, is inputted to a display control circuit of the image display unit. In such a case, the control signal inputted to the display control circuit is inputted based on the same interface specifications as those for an interface of the computer. Here, the interface specifications indicate specifications related to a command, data, etc. outputted from a communication apparatus, or specifications related to a command, data, etc. handleable by the communication apparatus.

Further, Japanese Patent Application Laid-Open No. Hei 7-302068 has clearly disclosed a display unit employed in a display system related to communications between each computer and the display unit. A non-volatile memory is installed in the display unit. Control codes related to height, width and brightness of an visual output at the display unit are stored in the non-volatile memory. Further, an identification code for allowing the computer to identify specifications for the display unit is also stored in the non-volatile memory. These information are read out as needed by the display system, and the computer recognizes the read information through the communications with the computer, thereby making it possible to control the display unit based on the information. The display unit aims to omit cumbersome image-quality adjustments such as horizontal and vertical display positions, display sizes, which are made by a user when the display unit is used, according to the above function.

However, the prior art had a restriction in that since a PC and a control circuit provided within the display unit directly communicated with each other, only specific serial interface specifications of the PC could handle or cope with them. Therefore, a problem arose in that in order to perform communications with a PC having other serial interface specifications, a control circuit compliant with new serial interface specifications needed to be re-developed as a control circuit having a display unit, and hence the period and cost required to develop it increased.

While video signals adapted to the present display unit or information about video signal timing have been stored in the non-volatile memory of the display unit shown as the conventional example, the use of the stored information alone would cause a problem of shortage in information such as the occurrence of trouble in the display unit in particular upon using the display unit.

Further, since there was no means for performing conversion between different interface specifications of commonly-used digital signal processing devices having communication functions under the present situation even as to communications based on the different serial interface specifications, the digital signal processing devices having the different interface specifications could not be connected.

On the other hand, Japanese Patent Application Laid-Open No. Hei 10-116139 has clearly disclosed a display unit having incorporated therein a Hub function of a USB (Universal Serial Bus) corresponding to a new interface of a PC, as another prior art. The Hub of the display unit comprises one UP port connected to an external computer, three Down ports to which peripheral apparatuses are connected, and a Hub control circuit. When the UP port of the Hub is connected to each external computer such as a PC or the like, the Hub gives identification information such as the maker's name of the Hub, the product name thereof, its production number, the number of Down ports, etc. held in a Hub controller for performing the control of a Hub function within the Hub control circuit, to the external computer through the UP port as a reply to the external computer, whereby the external computer can recognize the Hub. In doing so, the external computer transfers an operation instruction to the Hub, so that the Down ports of the Hub can be used. When the peripheral apparatuses are connected to the Down ports of the Hub in this condition respectively, communications between the peripheral apparatuses and the external computer are allowed so that the peripheral apparatuses are activated.

However, the prior art has a problem in that since the Hub is recognized according to the maker name of the Hub, the product name thereof and its production number recorded in the Hub controller, general versatility is not obtained. When a display unit is shipped in the form of the brand name of another company, for example, it is necessary to rewrite the maker name or the like recorded in a Hub controller so as to coincide with that of the display unit for each shipment. Therefore, a problem arose in that a Hub having general versatility was not obtained and the manufacturing cost of the Hub would increase.

There is a possibility that since information about the specifications of the display unit should be originally held on the display unit side, the specifications information of the display unit, which has been held in the Hub, will differ from that of an actual display unit upon holding it on the Hub side, thus causing an inconsistency.

With the foregoing problems in view, an object of the present invention is to provide a display unit having high general versatility, which is adapted to interface specifications of communications with various computers.

Another object of the present invention is to provide a display unit excellent in maintenance, which is capable of obtaining various information inside the display unit.

DISCLOSURE OF THE INVENTION

A display unit according to the present invention for achieving the above objects is a display unit having a CPU and means for communicating with a computer, which comprises interface specifications converting means for performing mutual conversion between interface specifications about communications from the computer and interface specifications handleable by the CPU. Further, the interface specifications converting means can take such a structure as to be detachable from and attachable to the display unit. When the interface specifications of the computer are also changed to another upon replacement of the computer connected to the display unit with another, the interface specifications converting means can be replaced by another interface specifications converting means adapted to the interface specifications conversion.

Owing to such a structure, interface specifications of communications with various computers can be handled by the same display unit without the replacement and modification of the display unit. In terms of the function of performing the mutual conversion between the interface specifications of the computer and those of the display unit, the interface specifications converting means is not limited to the provision thereof within the display unit. The function of performing interface mutual conversion similar to the above is allowed to serve even by providing it on the computer side.

Thus, the display unit according to the present invention is capable of communicating with computers having interfaces with various specifications owing to the use of such interface specifications converting means. When viewed from the computer side, each computer is capable of communicating with display units having various interface specifications.

Described specifically, a serial interface adapter is provided in a display unit as interface specifications converting means. The serial interface adapter is capable of converting communication information about interface specifications from a computer to communication information about interface specifications suitable for a CPU included in the display unit, and reversely converting the communication information about the interface specifications for the CPU included in the display unit to the communication information about those for the computer. The interface converting means eliminates the need for replacement of the display unit or re-development of the CPU included in the display unit for the purpose of performing matching with the interface for the communications from the computer. When the removable interface specifications converting means is installed on the display unit, the position of its attachment is placed on the periphery or the like of a display screen of the display unit, whereby the operability of a user at the replacement can be improved. If the attached position of the interface specifications converting means is placed in the neighborhood of a power switch, for example, the facilitation of exchange for the user is improved as is the case with the turning on and off of the power. As an effect obtained by placing the attached position in the position around the display screen of the display unit, a similar effect can be obtained even in the case of the provision of the interface adapter used as interface means for allowing a converting means-free communication as well as in the case of the installation of the interface specifications converting means. Here, the communication employed in the present invention means that at least information such as a command can be bidirectionally transmitted and received between two apparatuses. Information including data information except for the command may be used as the above information.

While the function of performing mutual conversion between the above-described different interface specifications serves as one for the communications between the computer and the display unit, it is not limited to the communications between the computer and the display unit. Interface mutual conversion between commonly-used digital signal processing devices can be also carried out in the same manner by similar interface specifications converting means. Thus, the present invention provides a communication system which comprises interface specifications converting means for allowing mutual interface specification conversion for communications between digital signal processing devices different in interface specifications, a digital signal processing device provided with the interface specification converting means, a digital signal processing device having a portion to which the interface specification converting means is attached, and interface specifications converting means for performing mutual conversion between interface specifications for two digital signal processing devices and their communications.

The interface specifications converting means installed in the display unit is provided with a hub. A plurality of computers and a plurality of peripheral apparatuses are connectable to the hub. Here, the hub has a upstream port to which a computer is connected, and downstream ports to which peripheral apparatuses are connected, and freely performs mutual communications between the computer and the peripheral apparatuses through these ports. Owing to the connection of the computer and the peripheral apparatuses through the hub, one computer and a selected peripheral apparatus are communicable with each other. Even during its communication, the communication between the computer and another selected peripheral apparatus can be further carried out.

Further, the display unit according to the present invention is capable of having a memory area having stored therein an internal state of the display unit at its normal operation in addition to the conventional memory area for storing the information about the video signals and the video signal timing handleable by the display unit therein. Further, the display unit is able to have means for detecting the internal state of the display unit. Detailed operation information about the display unit can be obtained by a comparison between information about the internal state of the display unit at its normal condition, which is stored in the memory area, and the result of detection by the means for detecting the internal state of the present display unit.

Since the present invention is provided with the interface specifications converting means for converting the interface specifications of the computer connected for communication to the interface specifications handled or supported by the CPU included in the display unit, the present invention can cope even with a matrix type display unit as well as with a CRT (Cathode Ray Tube).

A display unit according to the present invention also comprises a video processing circuit to which video signals of R, G and B are inputted, a display device for performing a display based on the output of the video processing circuit, a drive circuit for driving the display device based on synchronizing signals inputted thereto together with the video signals, a CPU for controlling the video processing circuit and the drive circuit, and a hub unit for connecting peripheral apparatuses to an external computer. The display unit brings about another effect in that means for holing all or part of identification information transmitted to the hub unit is provided inside the display unit excluding the hub unit.

Further, a display unit according to the present invention for achieving the above objects comprises a video processing circuit to which video signals of R, G and B are inputted, a display device for performing a display based on the output of the video processing circuit, a drive circuit for driving the display device based on synchronizing signals inputted thereto together with the video signals, a CPU for controlling the video processing circuit and the drive circuit, and a hub unit for connecting peripheral apparatuses to an external computer. The display unit is characterized in that first recording means for holding all or part of identification information indicative principally of the display unit, which is transmitted to the hub unit is provided inside the display unit excluding the hub unit, and second recording means for holing all or part of identification information indicative principally of the hub unit is provided inside the hub unit.

Furthermore, means for holding all or some of the identification information transmitted to the hub unit may be provided inside the external computer.

BEST MODE FOR CARRYING OUT THE INVENTION

Embodiments of the present invention will be described with reference to the accompanying drawings.

Figure 1:
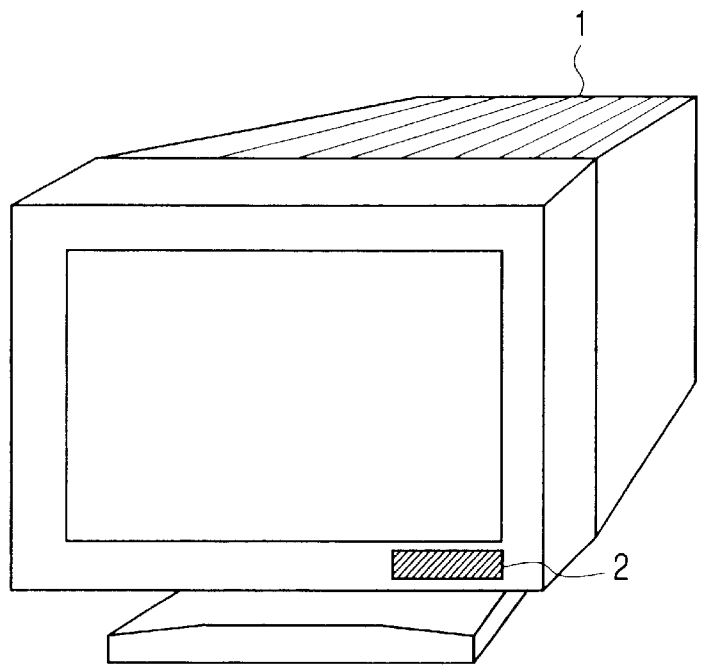
FIG. 1 shows one embodiment of a display unit according to the present invention and is a diagram showing an outward appearance thereof.

FIG. 1 is a diagram showing an outward appearance of a display unit illustrative of one embodiment according to the present invention. In the same drawing, reference numeral 1 indicates a cabinet and reference numeral 2 indicates a serial interface adapter. The serial interface adapter 2 performs the mutual-conversion function of converting interface specifications sent from an external device such as a PC or the like to corresponding interface specifications of the display unit and inversely converting interface specifications of a CPU included in the display unit to suitable or compatible interface specifications of the external device such as the PC or the like.

The display unit according to the present invention, having the function of performing mutual conversion between different interface specifications, can be implemented even by a configuration wherein the serial interface adapter 2 is built in a portion designated at numeral 2 in FIG. 1 of the display unit or even by a configuration in which the serial interface adapter 2 of the display unit can be exchanged with another.

The configuration wherein the serial interface adapter 2 is incorporated into the display unit, brings about an effect in that as shown in FIG. 1, the mounted position of the serial interface adapter 2 is placed in front of the cabinet 1 or around a display screen thereof or the like to thereby facilitate the replacement of a connector connected to the serial interface adapter 2 from the external device with another and the like.

Further, in the configuration wherein the serial interface adapter 2 is replaceable with another serial interface adapter 2, the detached/attached position of the serial interface adapter 2 is placed in front of the cabinet 1 or around the display screen to thereby improve the facilitation of on-exchange operation of the serial interface adapter 2. The serial interface adapter 2 can be also connected to the display unit in outboard form outside the display unit. As compared with its externally-mounted form, however, the effect of eliminating the need for wiring between the display unit and the serial interface adapter 2, for example, is brought about even in the case of either of the configurations wherein the serial interface adapter 2 is caused to exist inside the cabinet 1, and hence the implementation of a clean-cut display unit can be achieved.

Further, the adapter provided in front of the display unit or around the display screen thereof is not necessarily limited to the serial interface adapter 2 used as interface specifications converting means. When the display unit and the external device are identical to each other in interface specifications for communications, the facilitation of operation at the connection of a communication connecting terminal to the external device or disconnection of the same therefrom can be achieved by providing interface means used as an adapter accepting an interface specification-based connecting terminal of an external device, at the location designated at numeral 2 in the cabinet 1 in FIG. 1 or providing it in the neighborhood of a power switch of the display unit.

Figure 2:
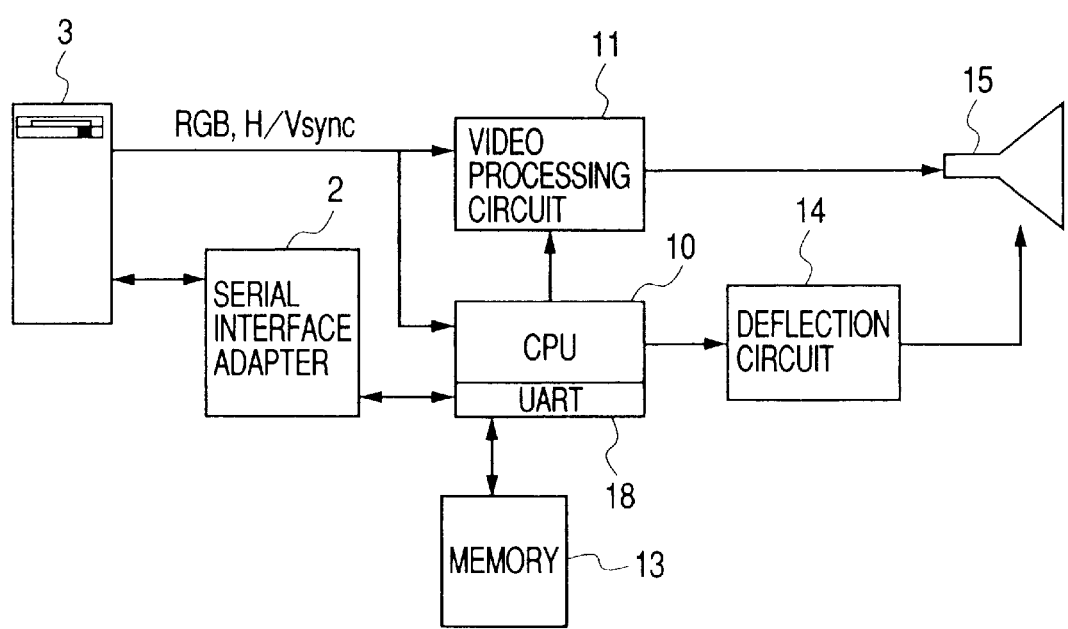
FIG. 2 is a diagram showing one embodiment comprising a display unit according to the present invention, a computer and a system.

A block diagram of a system comprising a serial interface adapter 2, a display unit and a computer is shown in FIG. 2. In FIG. 2, the display unit has a serial interface adapter 2, a CPU 10, a video processing circuit 11, a memory 13, a deflection circuit 14, and a CRT 15. The CPU 10 is controlled according to information based on Universal Asynchronous Receiver/Transmitter: hereinafter described as UART specifications. One receiving UART based on controllable specifications of the CPU 10 is designated at UART 18. While the serial interface adapter 2 is provided in the display unit in FIG. 2, it may take such a structure as to be detached from or attached to the display unit as described above. Further, a PC 3 will be used as a computer.

Referring to FIG. 2, the serial interface adapter 2 converts serial interface specifications for a command or data sent from the PC 3 to the UART specifications controllable by the CPU 10 and supplies the same to the CPU 10. Contrary to the above, the serial interface adapter 2 converts UART specifications for a command or data sent from the CPU 10 to serial interface specifications suitable for the PC 3 and transmits it to the PC 3.

Owing to the data, command and communication protocol conversion functions of the above-described serial interface adapter 2, the CPU 10 of the display unit can cope with new serial interface specifications without any change by, upon connection to PC different in interface specifications, simply replacing it with each of serial interface adapters 2 fit for the respective specifications.

In the present embodiment, the invention has been achieved by inserting the serial interface adapter into the cabinet. However, even if the serial interface adapter is externally attached to the display unit, an effect similar to the above can be obtained. The serial interface adapter 2 used as the interface specifications converting means for performing mutual exchange between the different serial interface specifications has been described as one provided inside the display unit or one attachable to the display unit. However, even when the computer is allowed to have the function of the serial interface adapter 2 used as the interface specifications converting means, the serial interface adapter 2 can obtain an effect similar to that obtained when it is provided on the display unit side.

Figure 3:
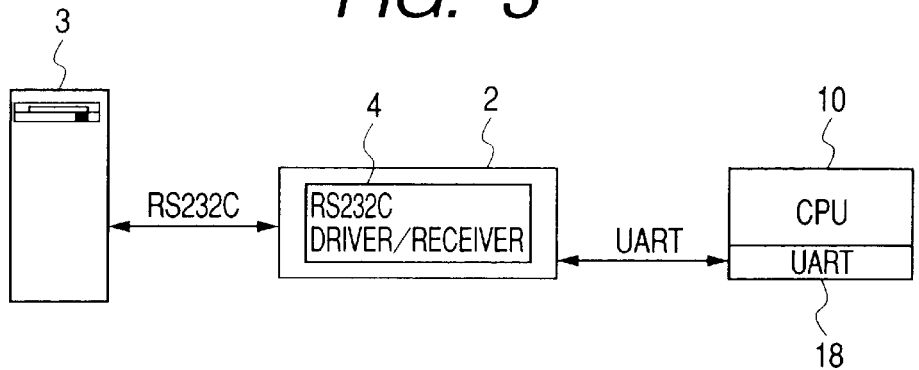
FIG. 3 is a diagram illustrating a configuration of a system which performs interface specifications mutual conversion using a serial interface adapter according to the present invention.

FIG. 3 is a diagram showing the manner in which communications are made between a PC 3 and a CPU 10 of a display unit through a RS232C interface and shows one embodiment of the present invention. A RS232C driver/receiver 4 provided within a serial interface adapter 2 converts a command or data sent from the PC 3 in the form of RS232C specifications to UART specifications of the CPU 10 and supplies the converted UART specifications to the CPU 10. Contrary to the above, the RS232C driver/receiver 4 converts information sent from the CPU 10 in the form of the UART specifications to the RS232C specifications and transmits the converted RS232C specifications to the PC 3. In order to perform interface specifications mutual conversion in this case, the RS232C driver/receiver 4 is provided with, for example, an amplitude converter. The amplitude converter effects voltage-amplitude transformation on a signal based on the RS232C specifications outputted from the PC 3 to the display unit to thereby convert it to a signal based on the UART specifications of the CPU 10 included in the display unit. Reversely, the amplitude converter effects voltage-amplitude transformation on a signal based on UART specifications outputted from the display unit to the PC 3 to thereby convert it to a signal based on RS232C specifications and transmits it to the PC 3.

By implementing the RS232C driver/receiver 4 in the serial interface adapter 2 and inserting the serial interface adapter 2 into its corresponding cabinet 1 as described above, the PC 3 and the display unit according to the present invention can carry out RS232C communications therebetween.

Figure 4:
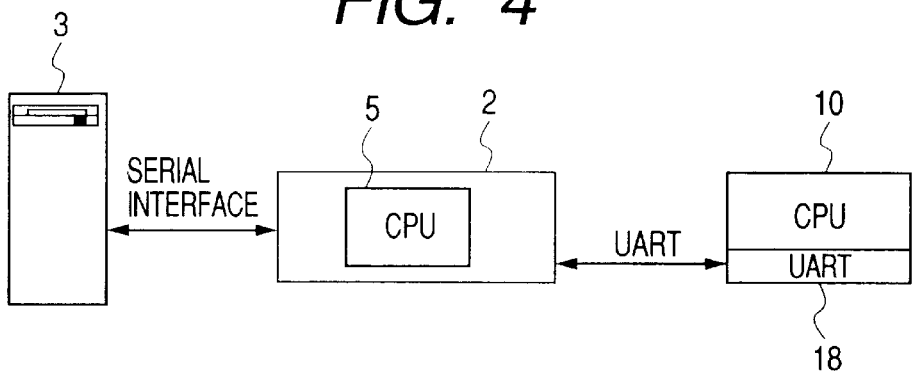
FIG. 4 is a diagram depicting a configuration of a system which performs interface specifications mutual conversion using a serial interface adapter according to the present invention.

Another embodiment of the present invention will next be described with reference to FIG. 4. The aforementioned embodiment shows the example in which the RS232C interface specifications are converted into the UART specifications, whereas the present embodiment shows an example in which other serial interface specifications different in communication protocol, and command and data configurations are transformed to UART. Since a display unit according to the present embodiment is identical to the aforementioned embodiment in all points except for the configuration of a serial interface adapter 2, only the configuration of the serial interface adapter 2 is shown in FIG. 4 and will be explained. In the embodiment using the aforementioned RS232C interface, the serial interface adapter 2 can cope with the above processing by the voltage and polarity conversion of the signal alone. However, since it is necessary to convert communication protocol, command and data configurations of a PC 3 to UART specifications and reversely convert communication protocol, command and data configurations based on UART specifications to serial interface specifications of the PC 3 in the present embodiment, the serial interface adapter 2 is equipped with a CPU 5 for their conversion. A software block diagram for controlling the CPU 5 is shown in FIG. 5.

Figure 5:
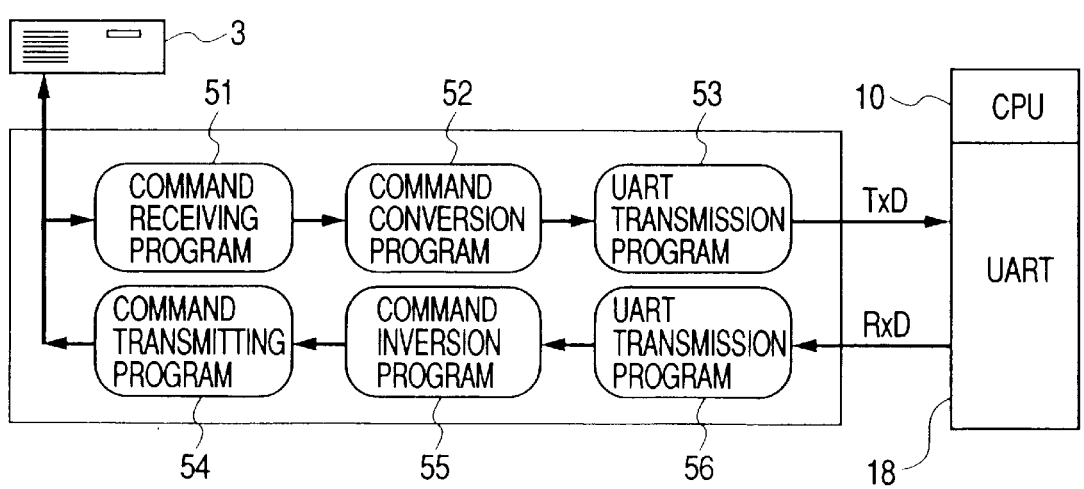
FIG. 5 is a diagram showing the manner in which a CPU having a serial interface adapter according to the present invention is controlled by software to thereby control interface specifications mutual conversion.

In FIG. 5, reference numeral 51 indicates a command receiving program, reference numeral 52 indicates a command conversion program, reference numeral 53 indicates a UART transmission program, reference numeral 54 indicates a command transmitting program, reference numeral 55 indicates a command inversion program, and reference numeral 56 indicates a UART transmission program, respectively. Operations of respective components of the CPU 5 will be described herein while the case in which a command is transferred from a PC 3 to a CPU 10, where conversion incident to its transfer is carried out, is being taken as an example. Even as for the operations of the respective components of the CPU 5 at the time that data is transmitted from the PC 3 to the CPU 10 or the operations of the respective components of the CPU 5 at the time that the conversion of a communication protocol at communications made between the PC 3 and the CPU 10 is performed, their processing can be carried out under control of the CPU 5 based on a software configuration similar to one shown in the same drawing.

The PC 3 generates a command thereinside and transmits the command to the serial interface adapter 2 attached to a front panel of a display unit in accordance with a communication protocol based on serial interface specifications. The serial interface adapter 2 receives the command under control based on the command receiving program 51 and starts processing by the CPU 5. After the command has been received by the serial interface adapter 2, the serial interface adapter 2 decodes the contents of the received command and converts it to a command configuration based on UART specifications supported by the CPU 10. The serial interface adapter 2 communicates with the CPU 10 through UART provided inside the CPU 10 under control based on the UART transmission program 53 and transmits the command subjected to command conversion to the CPU 10.

Now consider a signal having a length of N bytes (where N: natural number) compliant with interface specifications having device address information (display unit in this case) indicative of a device apparatus corresponding to a destination to transmit a signal at a first byte, address information indicative of the PC 3 at a second byte, information indicative of the length of a command at a third byte and command information at a fourth byte or later, as a signal outputted from the PC 3, for example. Of the signal outputted from the PC 3 to the display unit, the command information at the fourth byte or later is converted to a command having a length of M byte (where M: natural number) compliant with UART specifications of the CPU 10 under control of the CPU 5 based on the command conversion program 52. The converted command is transmitted to the device apparatus (display unit in this case) indicated at the first byte of the original signal under control of the CPU 5 based on the UART transmission program 53.

The operation of the CPU 5 at the time that a command is transferred from the CPU 10 to the PC 3 and specifications conversion incident to its transfer is performed contrary to the above, will next be explained. Even in this case, the operations of respective components of the CPU 5 at the time that data is transmitted from the CPU 10 to the PC 3 or the operations of the respective components of the CPU 5 at the time that the conversion of a communication protocol at communications made between the CPU 10 and the PC 3 is performed, can be carried out as described above as to their processing under the control of the CPU 5 based on a software configuration similar to one shown in the same drawing.

The CPU 10 first transmits a command produced thereinside to the CPU 5 of the serial interface adapter 2 by using UART. The CPU 5 receives the command transmitted from the CPU 10 under control of the CPU 5 based on the UART receiving program 56 and converts it to a command configuration supported by the PC 3 under control of the CPU 5 based on the command inversion program 55. Thereafter, the command is transmitted to the PC 3 in accordance with a communication protocol compliant with serial interface specifications supported by the PC 3 under control of the CPU 5 based on the command transmitting program 54.

Now consider a signal having a length of M' bytes (where M': natural number) compliant with interface specifications having device address information (PC 3 in this case) indicative of a device apparatus corresponding to a destination to transmit a signal at a first byte, address information indicative of a display unit at a second byte, information indicative of the length of a command at a third byte and command information at a fourth byte or later, as a signal outputted from the CPU 10 included in the display unit, for example. Of the signal outputted from the CPU 10 to the PC 3, the command information at the fourth byte or later is converted to a command having a length of N' byte (where N': natural number) corresponding to UART specifications of the CPU 10 under control of the CPU 5 based on the command inversion program 55. The converted command is transmitted to the device apparatus (PC 3 in this case) indicated at the first byte of the original signal under control of the CPU 5 based on the command transmitting program 54.

Owing to the above operations, even if the interface specifications of the PC 3 are changed or the interface specifications of the PC 3 are changed according to the exchange of the PC 3, the display unit according to the present embodiment can cope with new interface specifications of the PC 3 by simply replacing it with another serial interface adapter 2 capable of converting the new interface specifications of the PC 3 to interface specifications for the display unit. Further, a merit is brought about in that owing to the setting of the mounting position of the serial interface adapter 2 to an easy-to-exchange portion of a front panel or the like of the display unit, a user is able to perform the exchange without motion from the front of the display unit, so that ease of use is obtained.

While the devices intended for the execution of mutual conversion compliant with the serial interface specifications have been described as the display unit and the computer in the aforementioned embodiment, the present invention is not necessarily limited to them. They can be used even for communications between commonly-used digital signal processing devices respectively having different interface specifications. An embodiment in this case will be described using FIG. 12.

Figure 12:
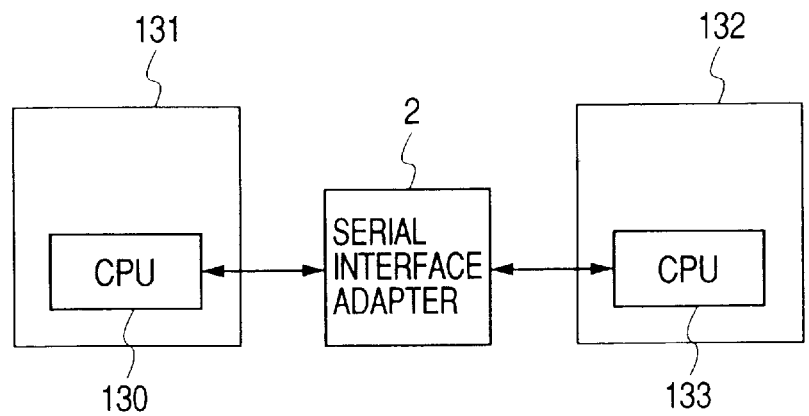
FIG. 12 is a diagram showing a configuration of one embodiment of a system to which a digital signal processing device is connected using a serial interface adapter according to the present invention.

Referring to FIG. 12, reference numeral 131 indicates a first digital signal processing device, reference numeral 132 indicates a second digital signal processing device, reference numeral 130 indicates a CPU having the first digital signal processing device, reference numeral 133 indicates a CPU having the second digital signal processing device, and reference numeral 2 indicates a serial interface adapter similar to that employed in the above-described embodiment, respectively. The CPU 130 and the CPU 133 will be defined as provided with interface specifications different from each other respectively. The serial interface adapter 2 is capable of performing mutual specification conversion of information about mutually-different interface specifications upon communications of the first and second digital signal processing devices.

Namely, the information about the interface specifications for the CPU 130 included in the first digital signal processing device 131 are converted to interface specifications controllable by the CPU 133 included in the second digital signal processing device 132 by the serial interface adapter 2, whereby communication is allowed. Contrary to this, the information about the interface specifications for the CPU 133 included in the second digital signal processing device 132 are converted to interface specifications controllable by the CPU 130 included in the first digital signal processing device 133 by the serial interface adapter 2, whereby communication is made possible. Here, the mutual conversion between the interface specifications by the serial interface adapter can be performed according to the operation similar to the operations carried out by the embodiments described in detail in FIGS. 3 and 4.

Further, the serial interface adapter 2 is shown in FIG. 12 as it exists outside the first and second digital signal processing devices. However, even if the serial interface adapter 2 is provided so as to be built in the first or second digital signal processing device or provided detachably from or attachably to the first or second digital signal processing device, the function of performing mutual conversion between the interface specifications is implemented in the same manner and hence the effect of performing mutual conversion between the interface specifications for communications according to the present invention is obtained in the same manner.

Figure 6:
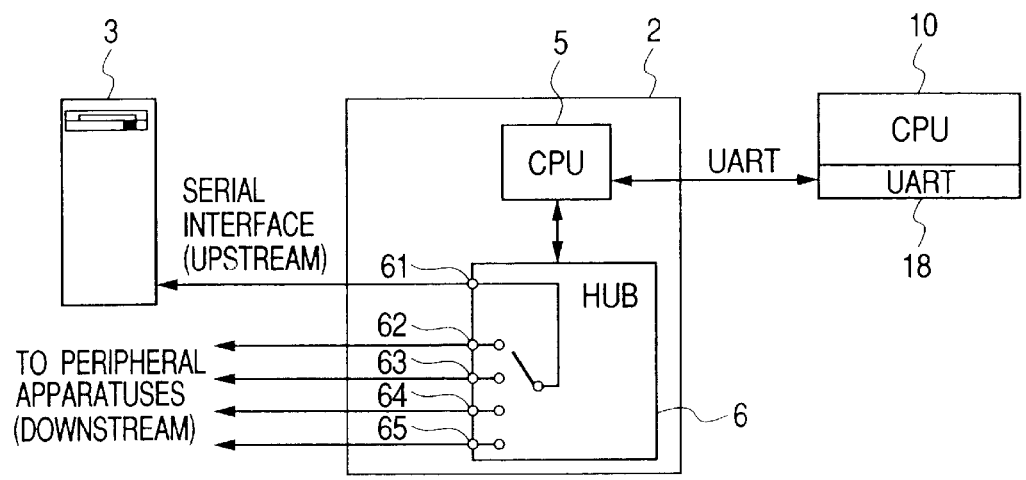
FIG. 6 shows a configuration of a serial interface adapter having a hub according to the present invention and is a diagram showing a communication system using the serial interface adapter.

An example of a configuration of a system comprising a serial interface adapter 2 of a display unit, a CPU 10 and a PC 3 is illustrated in FIG. 6 as a further embodiment of the present invention. The present example is characterized in that the serial interface adapter 2 has a hub. In the same drawing, reference numeral 6 indicates a hub, and reference numeral 61 indicates a port (hereinafter abbreviated as upstream port) for connection to the PC 3 used as a host. Reference numerals 62, 63, 64 and 65 indicate ports (hereinafter abbreviated as downstream ports) for connection to peripheral apparatuses respectively. In FIG. 6, the hub takes a configuration having four downstream ports. The number of the downstream ports included in the hub 6 may be greater than or less than the number shown in FIG. 6. As peripheral apparatuses connected to the downstream ports, may be mentioned a keyboard, a mouse, a joystick, a digital camera, a printer, a speaker, etc. In the present embodiment, the serial interface adapter 2 is equipped with the hub 6 and a CPU 5 included in the serial interface adapter 2 controls the hub 6 to thereby permit communications between the PC 3 and the peripheral apparatuses. However, the hub employed in the present invention will be defined as provided with the at least one upstream port to which a computer or the like is connected and a plurality of downstream ports to which peripheral apparatuses are connected and as provided with the function of broadening the width of selection for communications between the computer and the peripheral apparatuses through those ports to thereby enlarge communication environments of the entire system.

The hub 6 is controlled by a CPU 5 which communicates with the PC 3, and selects any of the peripheral apparatuses connected to the downstream ports according to its control, thereby making it possible to transmit information such as a command sent from the PC 3. Contrary to the above, information such as data sent from the selected peripheral apparatus can be also transmitted to the PC 3 through the hub 6. Here, an indicated state of a selector switch for performing switching between the downstream ports included in the hub 6 shown in FIG. 6 indicates the state that the selected peripheral apparatus communicates with the PC 3, and does not indicate the state that it is physically disconnected from the non-selected peripheral apparatuses. The information such as the command, data obtained by the PC 3 according to the communication made through the above hub 6 is transmitted from the PC 3 to the CPU 5 of the serial interface adapter 2 through the hub 6 and further sent to the CPU 10 included in a display unit under the control of the CPU 5. The display unit is capable of performing control on an image display or the like under control of the CPU 10 by its information. Data, command or the like transmitted from the hub 6 is converted to a structure of data, a command or the like handled or supported by the CPU 10 under the control (corresponding to control similar to the control of the CPU 5 based on the program structure shown in FIG. 5) of the CPU 5, followed by transmission to the CPU 10 through a UART 18.

Further, a command compliant with UART specifications, which is outputted from the CPU 10, is transmitted via the UART 18 to the CPU 5, where the command based on the UART specifications is converted to one based on serial interface specifications handleable by the PC 3 under the control (corresponding to control similar to the control of the CPU 5 based on the program structure shown in FIG. 5), followed by transmission to the PC 3 through the hub 6.

Owing to the provision of the above-described hub 6 within the serial interface adapter 2, the serial interface adapter 2 of the display unit according to the present invention is capable of having a hub function. While, however, the serial interface adapter 2 is equipped with the hub 6 in the present embodiment, the hub may take such a configuration as to be able to communicate with the CPU 5 even if such a configuration that the display unit itself is equipped with the hub, is taken. When the display unit itself is equipped with the hub in such a configuration as not to be included in the serial interface adapter 2, an effect is brought about in that the trouble of replacing the peripheral apparatus connected to the hub with another upon the replacement of the serial interface adapter 2 is saved.

Figure 7:
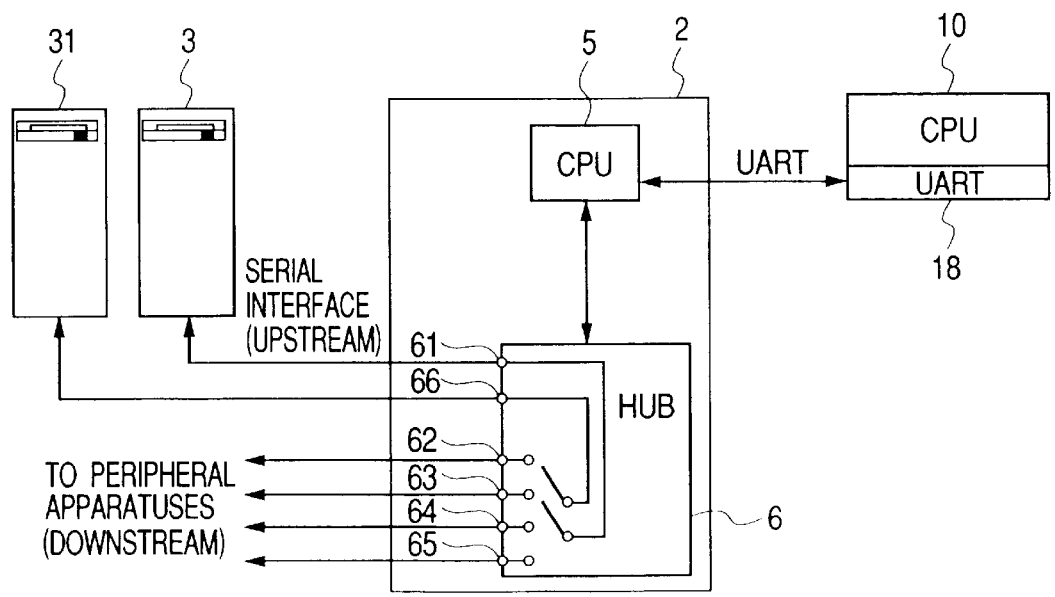
FIG. 7 illustrates a configuration of a serial interface adapter having a hub according to the present invention and is a diagram showing a communication system using the serial interface adapter.

A still further embodiment of the present invention is shown in FIG. 7. In FIG. 7, reference numeral 31 indicates a second PC, and reference numeral 66 indicates an upstream port of the PC 31. In the same drawing, those designated at the same reference numerals as those shown in FIG. 6 are the same ones and will be defined as provided with functions similar to those shown in FIG. 6, respectively.

As shown in FIG. 7, a serial interface adapter 2 of a display unit according to the present invention is capable of being connected to a plurality of PCs. Owing to its structure and control of a hub 6 by a CPU 5, the PC 31 is able to communicate with another peripheral apparatus connected to its corresponding downstream port, other than the corresponding peripheral apparatus being communicating with the PC 3 even while the PC 3 is being communicating with the peripheral apparatus connected to any of downstream ports 62 through 65, for example. Further, owing to increases in the numbers of upstream ports and downstream ports of the hub, communications between the PC and the peripheral apparatuses through the hub can be performed simultaneously and in parallel in plural ways, and communications between a plurality of PCs and a plurality of peripheral apparatuses can be controlled by their free switching. In this case, an image displayed on the display unit results in one based on a video signal sent from the PC 3 or PC 31. However, the selection of the displayed image is made possible by, for example, transmitting a switching control signal inputted via a mouse or a keyboard or the like connected to the PC 3, PC 31 or hub 6 to a CPU 10 according to communications made via the hub 6 and performing control of the CPU 10.

Figure 8:
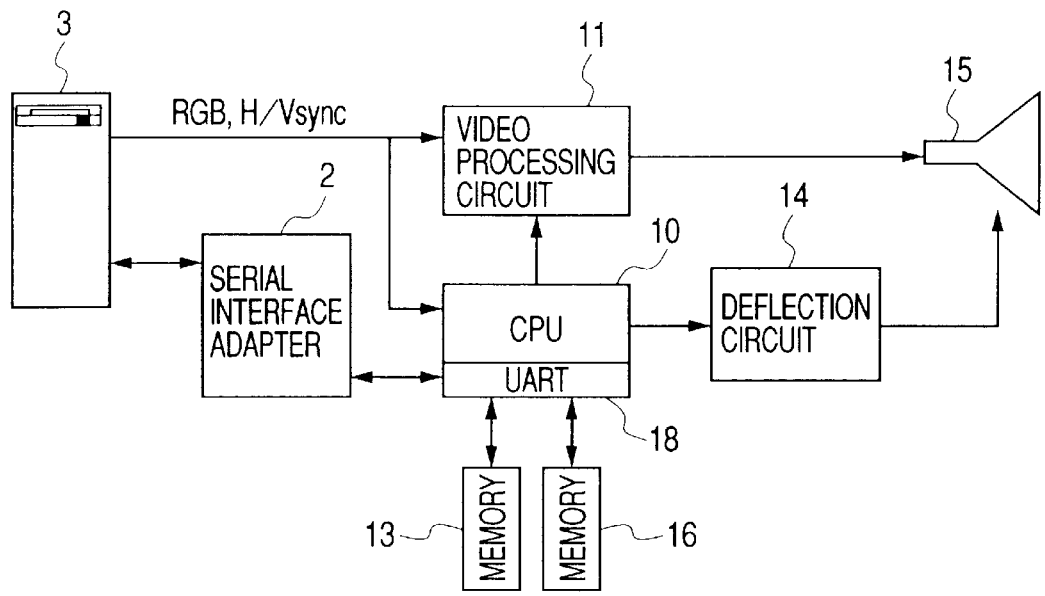
FIG. 8 is a diagram showing configurations of one embodiments of a display unit according to the present invention and a communication system using the display unit.

A block diagram illustrative of a configuration of a display unit showing a still further embodiment of the present invention and connections for communications with a computer via a serial interface adapter 2 is shown in FIG. 8. In the present embodiment, the display unit is one in which the display unit according to the embodiment illustrated in FIG. 2 is further equipped with a second memory 16.

An adjustment voltage range at the normal operation of a principal portion of the display unit is stored in the second memory 16. In the present embodiment, source voltage values and current values used for a video processing circuit 11, a deflection circuit 14 and an anode and grid of a CRT 15 are stored therein. A CPU 10 reads information stored in the memory 16 as necessary and effects specifications conversion using the serial interface adapter 2 on it, after which its information can be transmitted to a PC 3. A vide signal indicative of the information is transmitted to the display unit under the control of the PC 3. Thus, the contents of the information at the normal operation of the display unit can be displayed on the CRT 15 of the display unit and can serve as information for repair at trouble or the like of the display unit. Incidentally, while the memory 16 is provided separately from a memory 13 in the present embodiment, the memory 13 and the memory 16 may be made up of one memory. The contents stored in the memory 13 and the memory 16 may be stored in an internal memory provided within the CPU 10. Alternatively, either one of the contents of the memory 13 or the memory 16 may be stored in the internal memory lying within the CPU 10.

Figure 9:
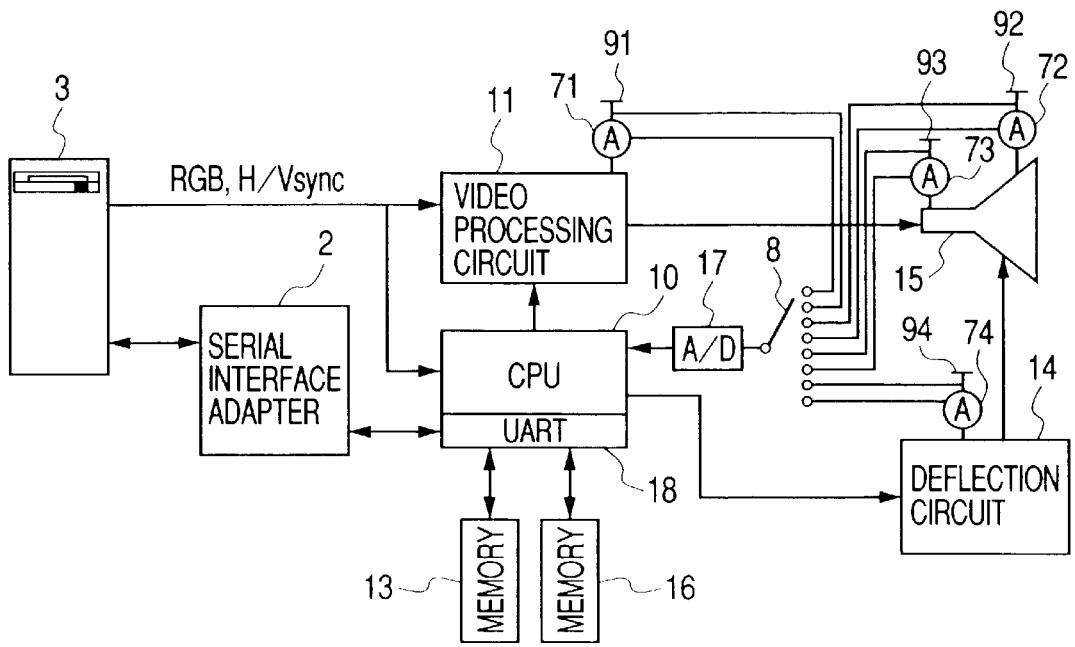
FIG. 9 is a diagram illustrating configurations of one embodiments of a display unit according to the present invention and a communication system using the display unit.

A block diagram illustrative of a configuration of a display unit and connections between the display unit and a computer via a serial interface adapter 2 is shown in FIG. 9 as a still further embodiment of the present invention. In FIG. 9, the elements of structure designated at the same reference numerals in FIG. 8 will be defined as having similar functions. Referring to FIG. 9, reference numeral 91 indicates a voltage source for a video processing circuit 11, reference numeral 92 indicates an anode voltage source for a CRT 15, reference numeral 93 indicates a voltage source for a second grid of the CRT 15, reference numeral 94 indicates a voltage source for a deflection circuit 14, reference numeral 71 indicates means for detecting a source current of the video processing circuit 11, reference numeral 72 indicates means for detecting an anode source current of the CRT 15, reference numeral 73 indicates means for detecting an anode current, and reference numeral 74 indicates means for detecting a source current of the deflection circuit 14, respectively. The detection of each current can be carried out by, for example, using a resistor in a section through which current flows and measuring a voltage drop developed across the resistor. Reference numeral 8 indicates a switch which performs switching between connections to the voltage and current detecting means of the respective portions, and reference numeral 17 indicates an A/D converter for converting a value detected by the detecting means selected by the switch 8 to a digital signal. The operation in FIG. 9 will be explained below.

According to a request issued from a PC 3 or a CPU 10, the A/D converter 17 converts a value detected by the detecting means selected by the switch 8 to a digital signal and supplies it to the CPU 10. Incidentally, although not illustrated in FIG. 9, the display unit according to the present embodiment has a level converter for matching each detected value with dynamic range of the input of the A/D converter 17. The CPU 10 transmits each detected value of each portion, which is converted to the digital signal, the values of the respective parts at the normal operation or information about an allowable range at the normal operation, each being preset to a second memory 16, to the PC 3 through the use of the serial interface adapter 2. The PC 3 determines whether the corresponding detected value coincides with each preset value or falls within the allowable range, and allows the result of determination to be displayed on the CRT 15.

Figure 10:
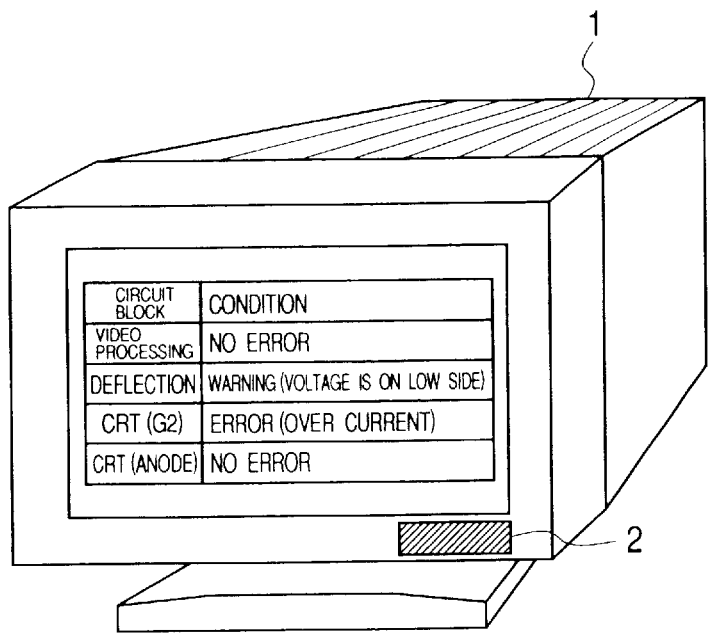
FIG. 10 is a diagram showing an example of a display screen on one embodiment of a display unit according to the present invention.

FIG. 10 is an example representative of results of comparisons between the values or allowable range preset to the memory 16 and actual values detected at the respective parts of the display unit. When the corresponding detected value coincides with the preset or falls within the allowable range, it is displayed as No Error, for example. On the other hand, when the detected value slightly falls below the allowable range, it is represented as Warning, for example and indicates the existence of a malfunction or abnormal condition. The abnormal contents of the part at which the abnormal condition exists, is displayed on the display unit. Further, when the detected value is found to be a significant anomaly such as an excessive current, it is indicated as Error, for example, and the abnormal contents thereof is displayed on the display unit.

As described above, the means for detecting the voltages and currents at the respective parts are provided and the values or allowable range at the normal operation are preset to the memory 16. Further, the information obtained from the means for detecting the voltages and currents at the respective parts and the information preset to the memory 16 are transmitted to the PC 3 through the use of the serial interface adapter 2, whereby the abnormalities developed in the respective parts inside the display unit can be easily recognized. A description will be made as to the display of the information at the respective parts in the display unit. When the display unit has an ON SCREEN DISPLAY; hereinafter described as OSD function other than the control from the PC 3 as described in the present embodiment, the information at the respective parts in the display unit may be displayed on the CRT 15 by using the OSD function.

Since the serial interface adapter 2 of the display unit according to the present invention is capable of carrying out bidirectional communications, an adjustment command and a set value are inputted from the PC 3 in the case of the occurrence of a slight anomaly of the order of Warning to re-adjust such an abnormal portion, thereby making it possible to resolve its occurrence.

Further, since items controllable by the CPU 10, such as bright, contrast, screen distortion, etc. can be handled under the independent control of the CPU 10 of the display unit without the intervention of the PC 3, an effect is brought about in that initial adjustments at factory shipment can be simplified and a change with the elapse of time can be controlled.

Figure 11:
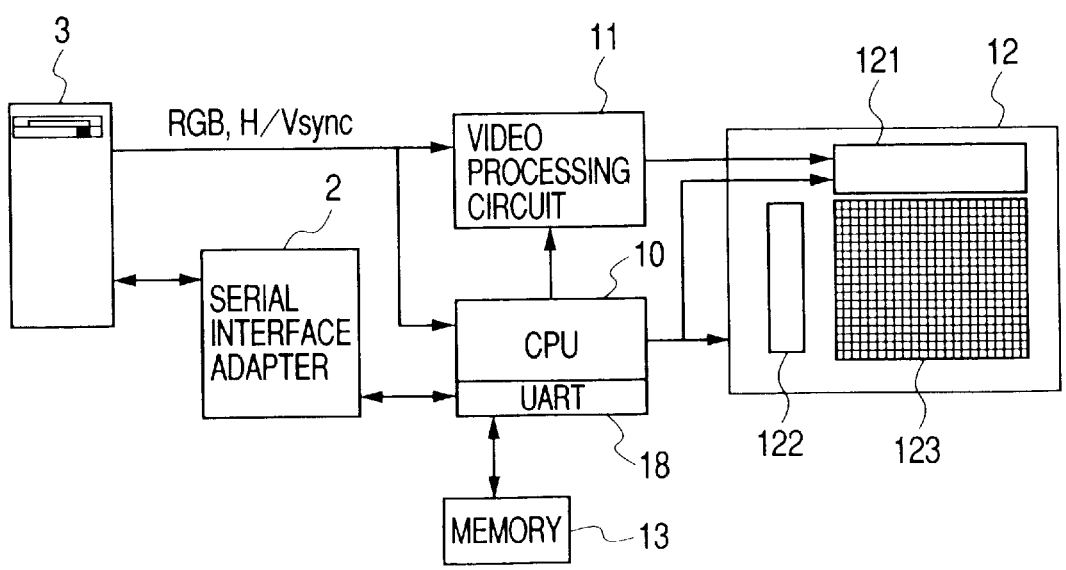
FIG. 11 is a diagram depicting configurations of one embodiments of a display unit according to the present invention and a communication system using the display unit.

A block diagram illustrative of a configuration of a display unit and connections between the display unit and a computer via the serial interface adapter 2 is shown in FIG. 11 as a still further embodiment of the present invention. In the same drawing, reference numeral 12 indicates a liquid crystal module, reference numeral 121 indicates a horizontal scanning circuit, reference numeral 122 indicates a vertical scanning circuit, and reference numeral 123 indicates a liquid crystal panel. The same portions as those shown in FIG. 2 are identified by the same reference numerals and the description of certain common elements will therefore be omitted.

The present embodiment is different from the embodiment shown in FIG. 2 in that the liquid crystal module 12 is used as a display device. The serial interface adapter 2 of the display unit according to the present invention can be used even in a liquid crystal display. The operation in FIG. 11 will be explained below.

Information such as the intrinsic resolution or the like of the display unit, which has been read from the memory 13, is transmitted to the PC 3 through communications made via the serial interface adapter 2. Afterwards, the PC 3 identifies video signal specifications and video signal timing adapted to the display unit. Further, the PC 3 outputs a video signal corresponding to the information of the display unit to the display unit side, and a video processing circuit 11 processes the video signal. The video signal outputted from the video processing circuit 11 is inputted to the horizontal scanning circuit provided within the liquid crystal module. The input horizontal and vertical synchronizing signals are respectively inputted to the horizontal scanning circuit 121 and the vertical scanning circuit 122, whereby an image based on the video signal transmitted from the PC 3 can be displayed on the liquid crystal panel 123. Owing to the reporting of resolution of the display unit itself to the PC 3, a matrix type display unit having fixed resolution can make a request to the PC 3 for the matched video signal of resolution. Therefore, the matrix type display unit has an advantage as compared with the CRT type display unit in that the information stored in the memory 13 is less reduced and an adjustment to the screen during the use of the display unit, for example is also simplified.

Incidentally, the matrix type display unit to which the serial interface adapter 2 according to the embodiment of the present invention is not limited to the liquid crystal display. All the embodiments referred to above are applicable to all types of matrix type displays such as plasma, LED, EL and DMD types.

While the CPU 10 employed in the embodiment of the present invention has been described by the example in which the UART is incorporated therein as the serial interface, one compliant with serial interface specifications other than the UART does not depart from the present invention. While the serial interface adapter 2 has been further described by using the example in which it is attached to the front panel, the attached position of the serial interface adapter 2 is not limited to the front panel. Even if it is provided on the periphery or the like of the display screen, an effect similar to the above is obtained. If the attached position thereof is taken within a range in which an improvement in the operability at the time that a user replaces the serial interface adapter with another, is achieved, the present invention is not affected by its attached position.

Figure 13:
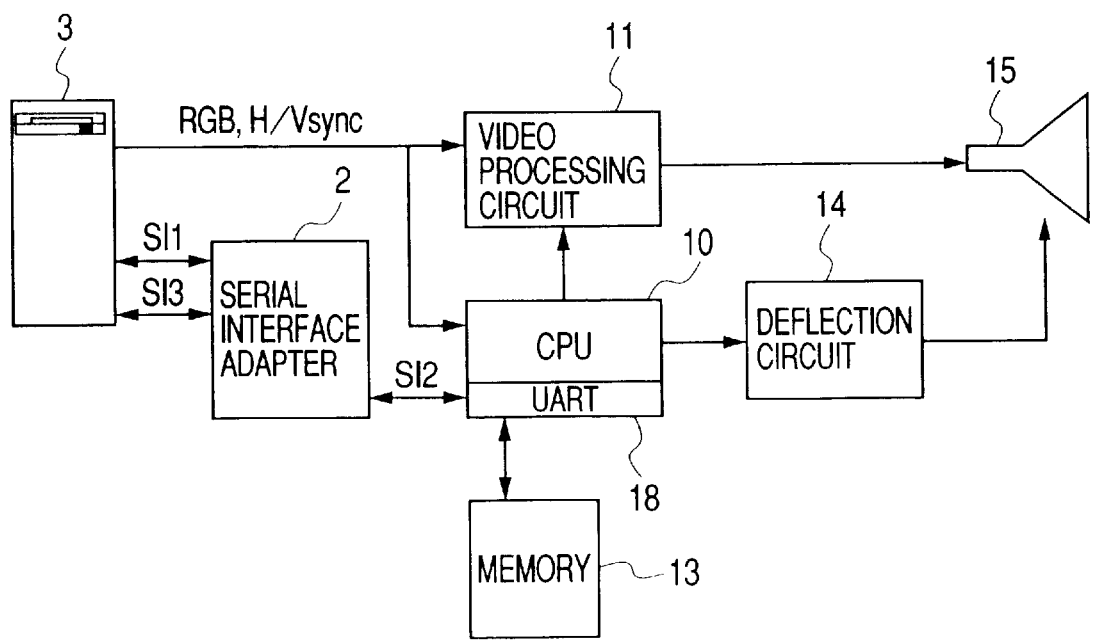
FIG. 13 is a diagram illustrating one embodiment having a plurality of serial interfaces as a system configuration of a display unit according to the present invention.

An example of a configuration of a display unit according to a still further embodiment of the present invention is shown in FIG. 13. Further, the details of a relationship between the serial interface adapter 2 and its communications will be shown in FIG. 14.

The embodiments, which have been explained up to now, have been described with, for example, the UART as the serial interface to the serial interface adapter 2 and the CPU 10. Subsequently, a serial interface SI1 to the PC 3 and a hub 6 of the serial interface adapter 2 will be called a first serial interface, and a serial interface SI2 to the serial interface adapter 2 and a CPU 10 will be referred to as a second serial interface. Here, communication protocols for the first and second serial interfaces will be defined as different from each other.

The present embodiment is different from the embodiments described up to now in that it can handle or cope even with a third serial interface for performing communications between the PC 3 and a CPU 5 of the serial interface adapter 2. Namely, the present embodiment provides the serial interface adapter 2 adapted to a plurality of types of interface specifications, the display unit having its function and a digital signal processing device.

Now consider where the third serial interface and the second serial interface are different in communication protocol from each other. The communication protocols for the first and second interfaces will also be explained as different from each other in the following embodiments. However, the following embodiments will be applied even to the same case. The third serial interface is hereinafter abbreviated as SI3 and an example of the operation thereof will be explained.

Figure 14:
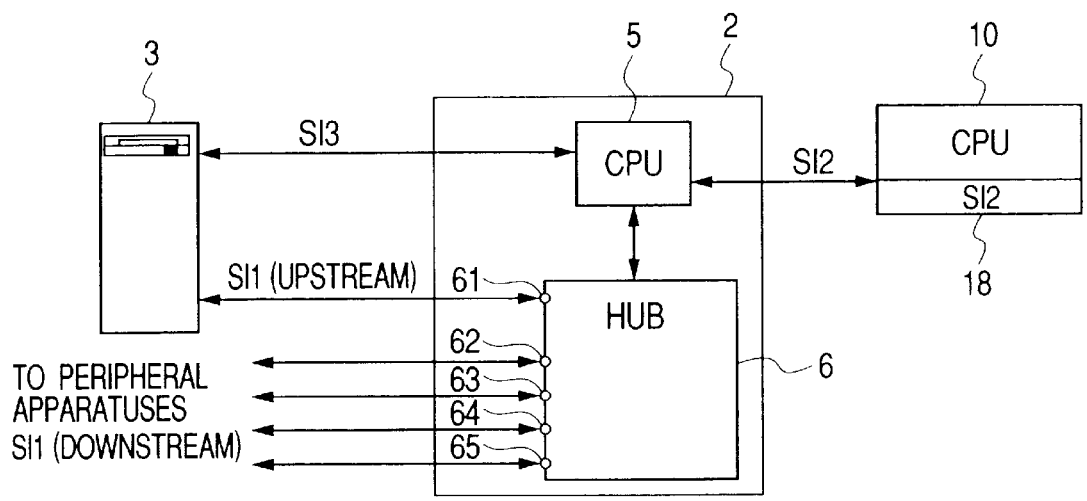
FIG. 14 is a diagram depicting configurations of one embodiments of a display unit according to the present invention and a communication system using the display unit.

In FIG. 14, the CPU 5 has thereinside basic information for a display, such as the name of a maker, type, serial number, corresponding signal specifications, etc. of a display unit for being adapted to the SI3. The PC 3 can supply a suitable video signal to the display unit according to the present invention by notifying the basic information of the display unit to the PC 3 through the SI3. Accordingly, a user is able to always display an image under the optimum conditions without performing cumbersome initial adjusting work of an image display position, screen distortion, etc. Further, the CPU 5 has command and protocol converting functions. Since the PC 3 and the CPU 10 for display control can bidirectionally swap a command or data with each other through the CPU 5, the PC 3 is capable of controlling the brightness, color temperature, screen distortion, display size, position, etc. of the display. Further, the PC 3 is also capable of obtaining adjustment values, identification information, performance information, etc. of the display unit as well as performing control based on its display information. Incidentally, the PC 3 may obtain a method of obtaining the display information, collectively. Alternatively, it selects the necessary information alone and may obtain the same individually.

Figure 15:
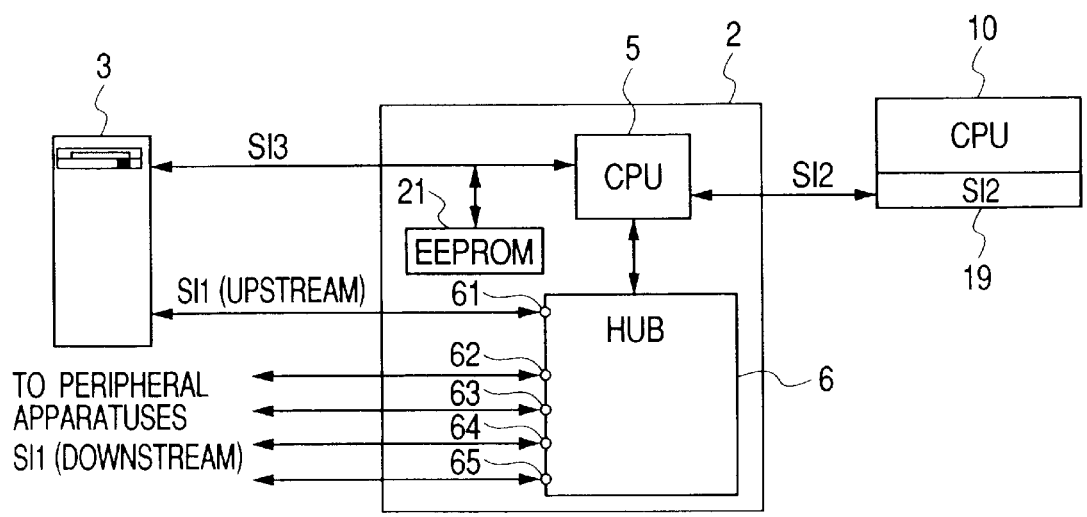
FIG. 15 is a diagram showing configurations of one embodiments of a display unit according to the present invention and a communication system using the display unit.

A still further embodiment of the present invention is shown in FIG. 15. In FIG. 15, the present embodiment is different from the above-described embodiment of the present invention in the configuration of the serial interface adapter 2.

The present embodiment is different from the above-described embodiment in that in order to record the basic information of the display unit described in the above embodiment, there is provided a memory circuit EEPROM 21 capable of rewriting internal data. The EEPROM 21 may use a general-purpose device having a normal memory function alone. However, it may use a dedicated device which incorporated therein a function for adapting to the SI3. FIG. 15 shows a configuration using the latter dedicated device. The operation of FIG. 15 will be explained below.

In FIG. 15, the SI3 will be regarded as adapted to a plurality of different communication levels. Now consider where a communication level 1 and a communication level 2 exist. Here, the communication level means a voltage level used when control on communications between the PC 3 and the EEPROM 21 through the SI3 is performed. When the PC 3 responds to the communication level 1 of the SI3, the EEPROM 21 transmits data to the PC 3 one bit by one bit in synchronism with a vertical synchronizing signal received form the PC 3. On the other hand, when the PC 3 responds to the communication level 2 of the SI3, the PC 3 outputs a clock signal different in frequency from the vertical synchronizing signal. Further, the EEPROM 21 reads out basic information of the display unit recorded in the EEPROM 21 in synchronism with the clock signal supplied from the PC 3 and transmits data to the PC 3. While the two communication levels have been described as the communication levels of the SI3 in the present embodiment, the type of communication level is not limited to the two in the present invention. Other communication levels do not depart from the present invention either if the PC 3 responds to communication levels at which reading control of the EEPROM 21 and communication control thereof are carried out.

Thus, the EEPROM 21 is provided within the serial interface adapter 2 an the PC 3 makes it possible to carry out the reading control and communication control of the EEPROM 21 in response to at least one communication level. As a result, the PC 3 is capable of identifying the display unit having the serial interface adapter 2. Even when a new display unit (whose basic information is not stored in the EEPROM 21) is connected to the PC 3, the PC 3 is capable of recognizing a new display unit by using one in which basic information of the new display unit is additionally recorded, as the EEPROM 21. Namely, the EEPROM 21 of the serial interface adapter 2 may be simply replaced with one having new basic information, and a CPU 3 and a hub 6 can be used in common. Further, when a electrically-erasable memory is used as the EEPROM 21, the basic information of the new display unit may be additionally written into the memory or rewritten. In this case, the serial interface 2 can be utilized in common regardless of the type of display unit. Further, control on the writing or rewriting of the basic information of the new display unit can be easily carried out from outside the display unit.

Incidentally, the present embodiment has described the example in which the electrically-erasable EEPROM 21 is used. However, the present embodiment is not necessarily limited to the EEPROM 21 as a memory. Alternatively, the EEPROM 21 may physically be replaced with a non-erasable and—programmable ROM. When an area for the electrically-erasable EEPROM 21 is provided inside the CPU 5, the area for the EEPROM 21 provided inside the CPU 5 may be used.

Figure 16:
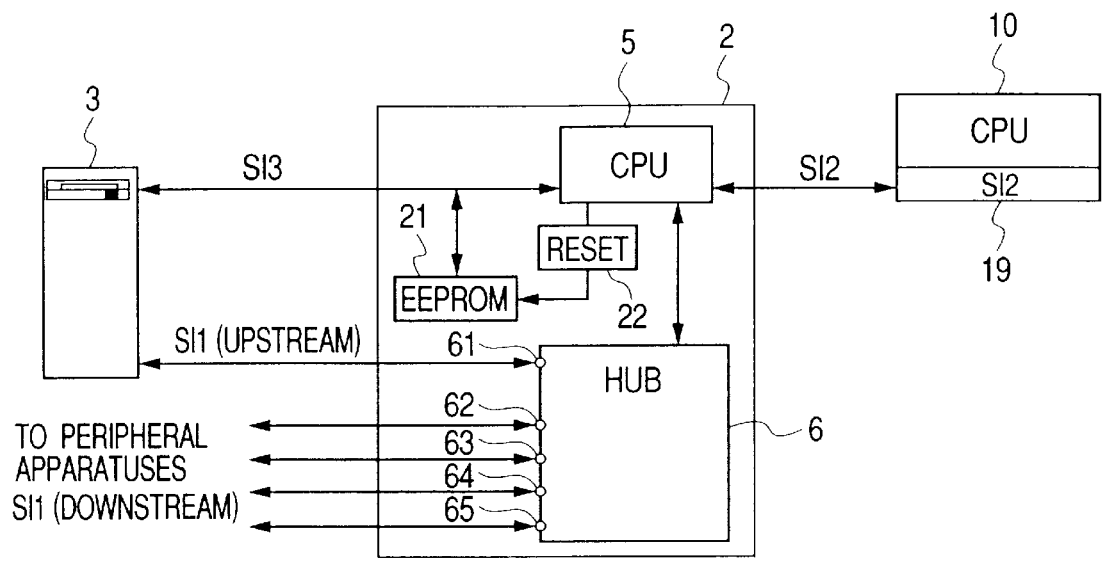
FIG. 16 is a diagram illustrating configurations of one embodiments of a display unit according to the present invention and a communication system using the display unit.

A still further embodiment of the present invention is shown in FIG. 16. The embodiment shown in FIG. 16 is different from the above-described embodiment in the configuration of the serial interface adapter 2.

The present embodiment is different from the above embodiment in that a device dedicated for an SI3 is used as an EEPROM 21 lying within the serial interface adapter 2 and a reset circuit 22 capable of resetting a communication operating condition of the EEPROM 21 to thereby restore it to its initial state is provided.

The operation of the embodiment under the configuration shown in FIG. 16 will be explained below.

When control on communications between the PC 3 and a CPU 5 is made under communication at a communication level 1 through the SI3, the PC 3 would not be able to recognize the EEPROM 21 when a communication level is changed to a communication level 2. In order to eliminate such an adverse effect, the EEPROM 21 is reset under the control of the CPU 5, thereby allowing the PC 3 to recognize the EEPROM 21 at the communication level 2 of the SI3. The operation is similar to the above even when the communication level has been changed from the communication level 2 to the communication level 1.

Figure 17:
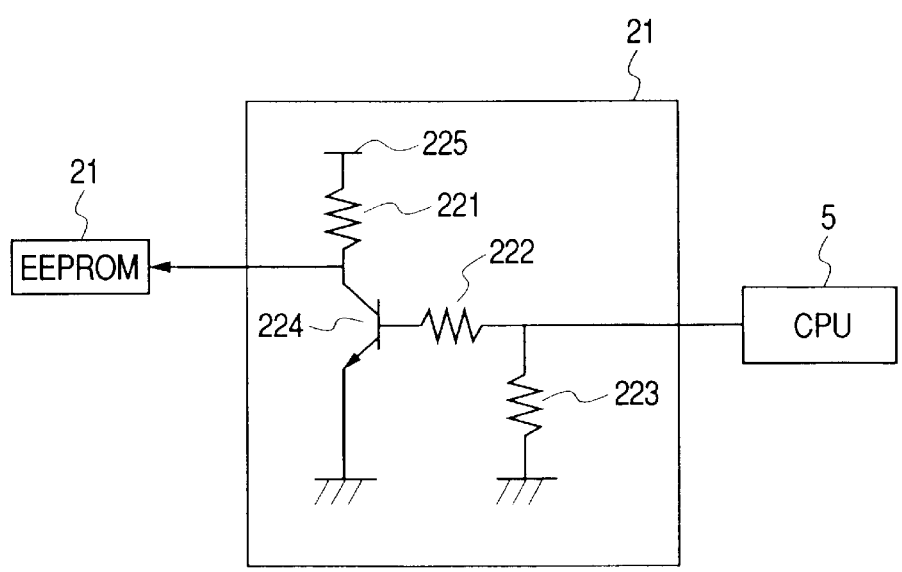
FIG. 17 is a diagram showing one example of a memory initializing circuit of a serial interface adapter of a display unit according to the present invention.

FIG. 17 shows one example of a reset circuit 22 for resetting the EEPROM 21 employed in the present embodiment.

In FIG. 17, reference numerals 221, 222 and 223 indicate resistors respectively, reference numeral 224 indicates an NPN transistor, and reference numeral 225 indicates a source for the reset circuit 22.

The reset circuit 22 is a common emitter switching circuit. When a signal inputted from the CPU 5 is a Low level, the NPN transistor 224 is brought to a cut-off state and a collector terminal of the NPN transistor 224 is brought to a High level. Therefore, the EEPROM 21 is brought to a power-on state. On the other hand, when the signal inputted from the CPU 5 is a High level, the NPN transistor 224 is brought to an active state and the collector terminal of the NPN transistor 224 is brought to a Low level, whereby the EEPROM 21 is brought to a power-off state.

When a CPU 10 detects the cut off of a video signal or synchronizing signal from the PC 3, the EEPROM 21 can be restored to a power-on initial state through the CPU 5. It is thus possible to carry out communications between the PC 3 and the EEPROM 21 through the SI3 again.

Incidentally, while the present embodiment has described the example in which the EEPROM 21 is restored to the initial state by being set to the power-off, the output of the CPU 5 may be inputted directly to a dedicated reset terminal when the EEPROM 21 has the dedicated reset terminal.

Figure 18:
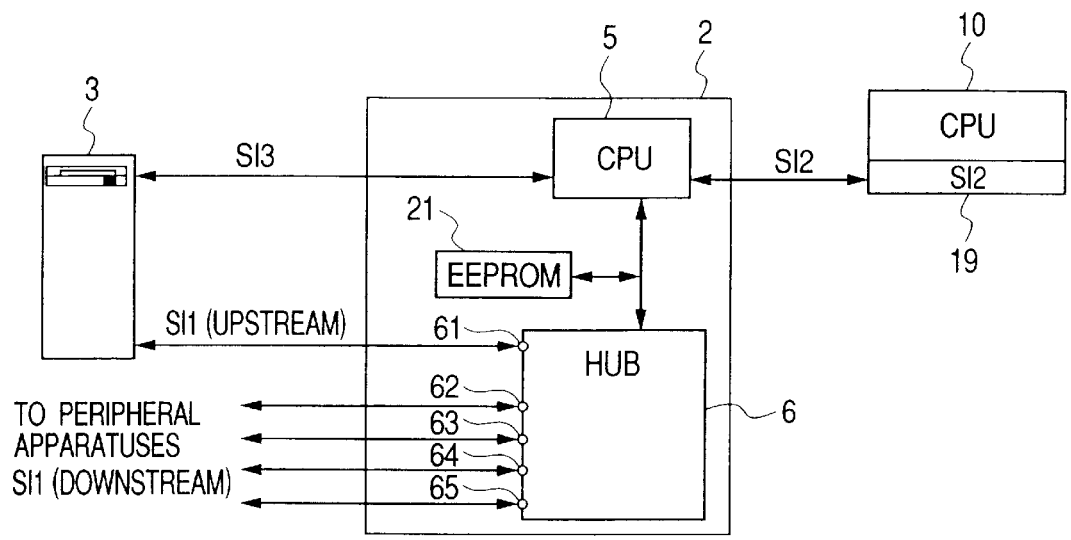
FIG. 18 is a diagram depicting configurations of one embodiments of a display unit according to the present invention and a communication system using the display unit.

A configuration of the serial interface adapter 2 of a display unit used as a still further embodiment of the present invention is shown in FIG. 18.

In the present embodiment, the point that data based on first serial interface specifications and data based on third serial interface specifications are capable of being recorded in and read out from an EEPROM 21 provided within the serial interface adapter 2, and the EEPROM 21 is used in common, is a novel point different from the above-described embodiment.

Sharing the use of an area for storage of common data between a first serial interface and a third serial interface makes it possible to reduce memory capacity.

Figure 19:
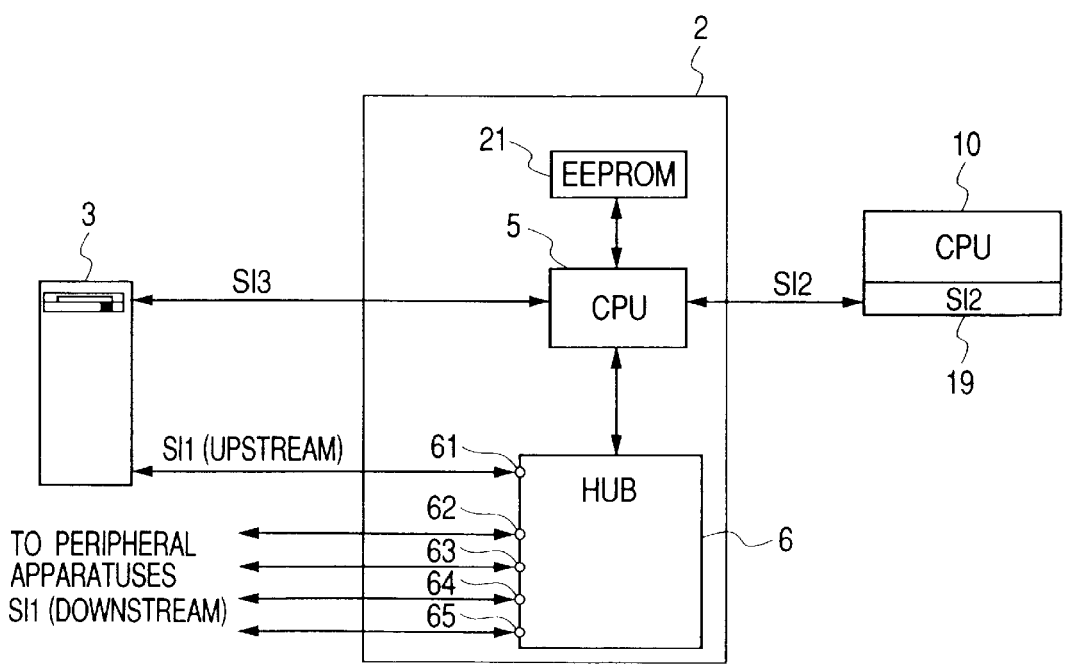
FIG. 19 is a diagram illustrating configurations of one embodiments of a display unit according to the present invention and a communication system using the display unit.

A still further embodiment of the present invention is shown in FIG. 19. In the present embodiment, a connecting position of an EEPROM 21 in a configuration of the serial interface adapter 2 of a display unit differs from that employed in the embodiment shown in FIG. 18.

In the present embodiment, lines which communicate with a CPU 5 provided within the serial interface adapter 2, are respectively independently provided specifically for a hub 6, a CPU 10 and the EEPROM 21.

Owing to the provision of the dedicated communication lines every devices, the occurrence of a failure can be notified to a user using a display unit through the use of the remaining other communication lines even when a certain communication line is interrupted due to significant trouble such as the destruction of a device.

When the communication line established between the CPU 5 and the hub 6 is interrupted by way of example, the CPU 5 detects its failure and transmits the contents of the failure detection to the CPU 10 through the use of the communication line established between the CPU 5 and the CPU 10 provided inside a display. Thereafter, the contents of the failure and a method of resolving the failure, etc. may be OSD-displayed on the display unit. Further, the contents of the failure detection is transmitted to the PC 3 through the use of an SI3 used between the CPU 5 and the PC 3, and the contents of the failure and the method of resolving the failure, etc. may be displayed on the display unit under software control of the PC 3.

Figure 20:
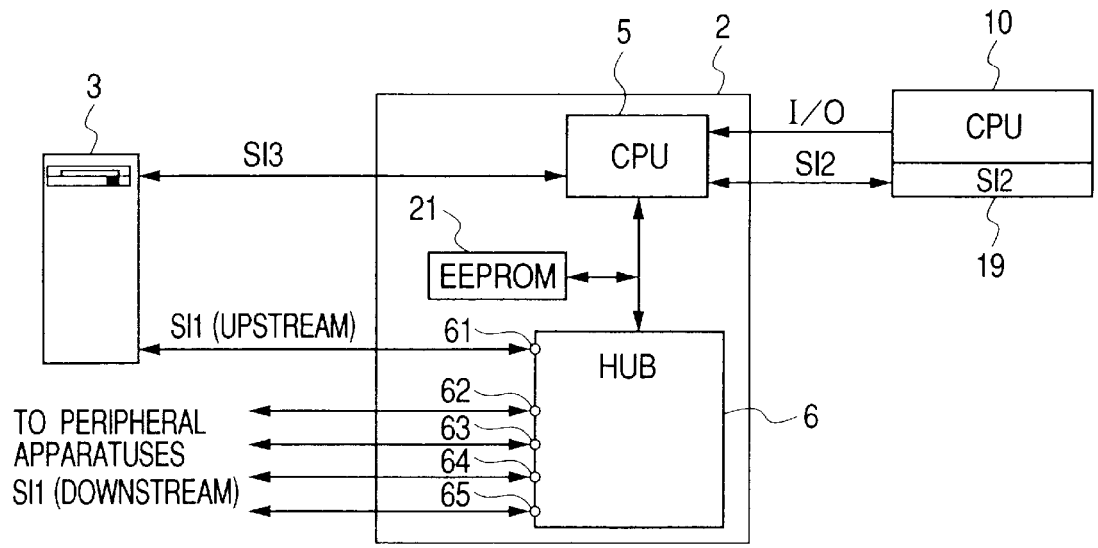
FIG. 20 is a diagram showing configurations of one embodiments of a display unit according to the present invention and a communication system using the display unit.

A still further embodiment of the present invention is shown in FIG. 20. The present embodiment differs from the aforementioned embodiment of the present invention in the configuration of the relationship of connections between the serial interface adapter 2 of a display unit and a CPU 10. The operation of FIG. 20 will be described below.

The present embodiment is provided with a flag function for notifying that a CPU 5 provided inside a display is in a state of being able to communicate, to the CPU 10 lying within the serial interface adapter 2 through an I/O port. Owing to the provision of the flag function, either the CPU 5 or the CPU 10 is able to communicate without any problem even when either of them starts operating ahead of the other. A description will be made below of a case in which the CPU 5 starts operating ahead of the CPU 10 and the CPU 10 starts operating ahead of the CPU 5.

When the CPU 5 starts operating antecedently to it, the CPU 5 is set so as not to communicate with the CPU 10 until it receives a flag indicative of the CPU 10 being in a state of being able to communicate, from the CPU 10. When the CPU 5 receives a command to be transmitted to the CPU 10 from the PC 3, for example, the CPU 5 holds the command received from the PC 3 or ignores it in some instances. After the reception of the communicable flag from the CPU 10 has been confirmed, the CPU 5 starts to communicate with the CPU 10. When the command outputted from the PC 3 is being held, the CPU 5 transmits the command to the CPU 10.

On the other hand, when the CPU 10 starts operating ahead of the other, the setting of an I/O port function for the CPU 10 and the initialization of a RAM are terminated. When it starts its normal operation, the CPU 10 transmits a flag for transferring communication being permitted, to the CPU 10. Thereafter, the operations of the CPU 5 and the CPU 10 are controlled according to a program so that the CPU 10 shifts to control on a display while the flag is being held until it starts to communicate with the CPU 5.

Owing to the programming of the CPU 5 and the CPU 10 as described above, either of the CPU is returned to its initial state when the power is newly turned ON after it temporarily undergoes a power OFF state due to the mixing of power noise or the like, for example. Since it is recovered according to the above procedure even when the CPU starts operating anew, it is not brought to a communication disable state.

Further, even if the CPU 5 or the CPU 10 is brought to a runaway state, forced initializing means such as a watch dog timer is used to forcedly initialize it, so that the CPU is recovered by the above procedure, thereby making it possible to bring it to a normal communication state.

Here, a device having the leadership of transmission and reception of data will be called master device. Further, a device, which performs the reception and transmission of data according to instructions given from the master device, will be referred to as slave device. In the embodiments described up to FIG. 19, the CPU 5 and the CPU 10 have so-called multi-master relationships in that they communicate so that when the data is transmitted from the CPU 5 to the CPU 10, the CPU 5 is taken as the master device and the CPU 10 is taken as the slave device and when the data is transmitted from the CPU 10 to the CPU 5, the CPU 10 serves as the master device and the CPU 5 serves as the slave device.

However, the relations between the CPU 5 and the CPU 10 employed in those up to the embodiment shown in FIG. 19 are not limited to the above. As in the case of the present embodiment shown in FIG. 20, the CPU 10 and the CPU 5 may have such a fixed relation that the CPU 5 is taken as a master device and the CPU 10 is taken as a slave device in that command data or the like can be transmitted from the CPU 10 to the CPU 5 for the first time by giving a sign to start the operation of the CPU 10 from the CPU 10 to the CPU 5 by using a flag function upon transmitting the command data or the like from the CPU 10 to the CPU 5. Under the control made under such a fixed relation, control stabler than the multi-master can be carried out, thus bringing about a malfunction preventing effect. It is also easy to develop products in terms of the function as compared with the fact that they have the multi-master relationship.

When the first serial interface and the third serial interface compete with each other, priorities such as precedence of the third serial interface over the other are provided upon communications with the PC 3, so that the ensuring of a stable communication state can be also achieved.

Figure 21:
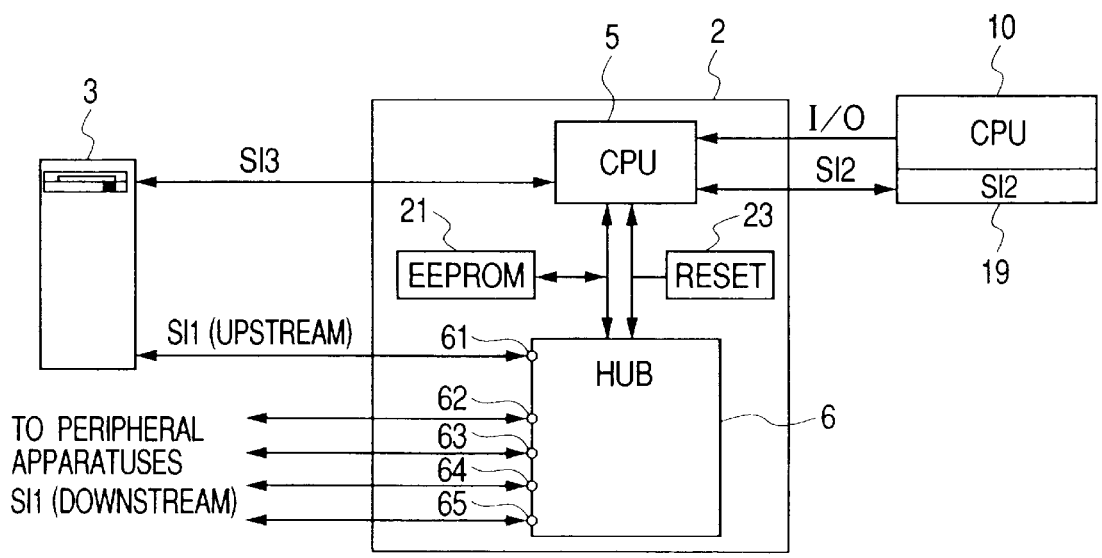
FIG. 21 is a diagram depicting configurations of one embodiments of a display unit according to the present invention and a communication system using the display unit.

A still further embodiment of the present invention is shown in FIG. 21. The present embodiment differs from the above embodiment in that the serial interface adapter 2 of a display unit according to the present embodiment is provided with a common reset circuit 23 for a CPU 5 and a hub 6.

When the common reset circuit 23 detects a reduction in source voltage applied to the CPU 5 or the hub 6 and instantaneous cut-off of power according to the common reset system, the CPU 5 and hub 6 can be re-started from their initial states so that a malfunction incident to a communication interruption can be prevented from occurring. Further, processing for connection to the PC 3 can be also re-started from the initial state by re-connecting an upstream port after the connection of the upstream port has been cut off temporarily, upon processing for initializing the hub 6.

While the present embodiment has described the example in which the CPU 5 and hub 6 share the use of reset, the present invention is not limited to it. The reset of the CPU 10 may be used in common.

Figure 22:
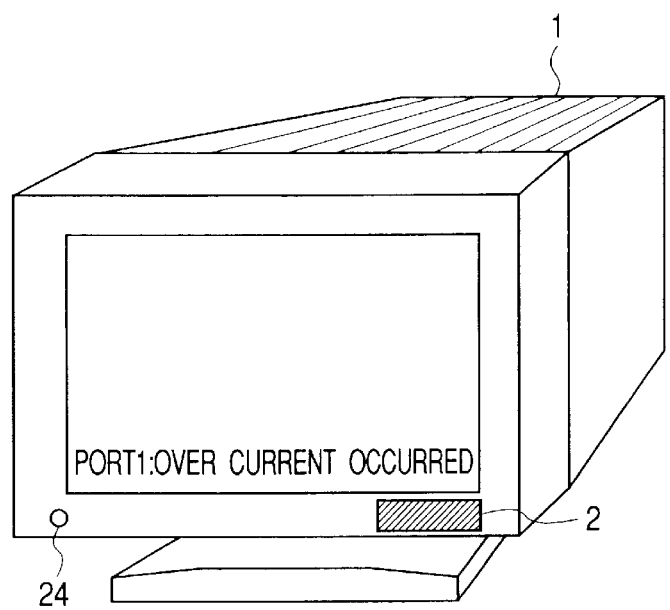
FIG. 22 shows one embodiment of a display unit according to the present invention and is a diagram showing an external appearance thereof.

An external view of a display unit showing a still further embodiment of the present invention is shown in FIG. 22.

The present embodiment differs from other embodiments in that a reset switch 24 of a serial interface adapter 2, which is different from a power on/off switch, is attached to a display unit 1. In FIG. 22, the position of the reset switch 24 is provided in the vicinity of a surface screen of a cabinet 1 of the display unit. However, the position thereof is not necessarily limited to that location. The reset switch may be placed in a position placed in the front (corresponding to a diagonally-shaded portion designated at numeral 2 in FIG. 22) of the serial interface adapter 2 and operable by a user, for example.

Figure 23:
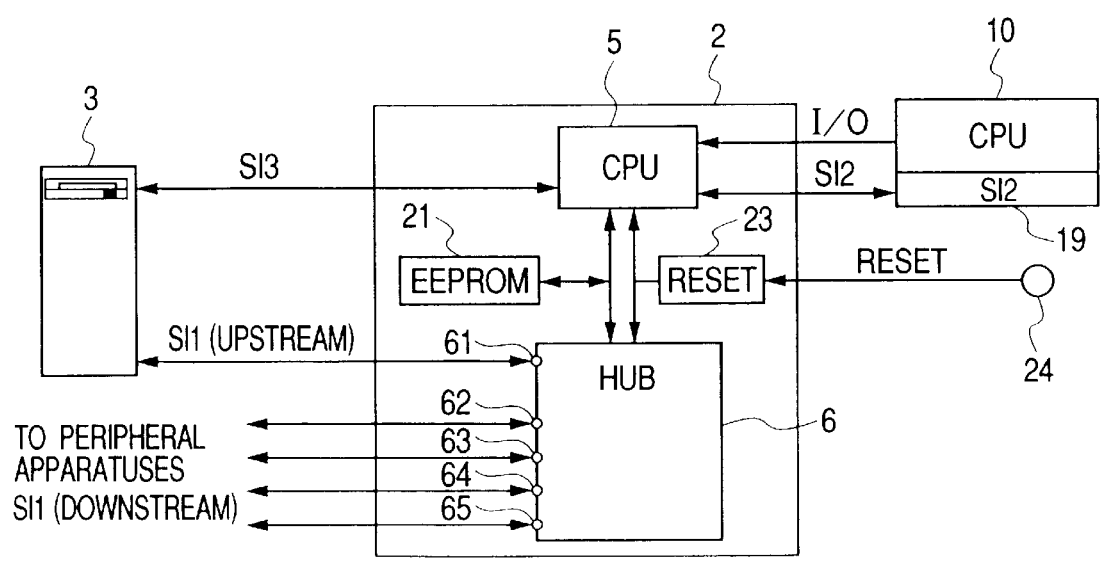
FIG. 23 is a diagram showing configurations of one embodiments of a display unit according to the present invention and a communication system using the display unit.

A diagram of an internal configuration in which the configuration of FIG. 21 is provided with a reset switch 24, is shown in FIG. 23.

In FIG. 23, the CPU 5 and the CPU 10 are programmed so that when a user pushes the reset switch 24, the common reset circuit 23 returns the CPU 5 and hub 6 to their initial states and the connection between the PC 3 and upstream port is temporarily cut off and re-connected. Owing to the programming of the CPU 5 and the CPU 10 as described above, when the user recognized that a device connected to, for example, a downstream port 62 suffered a breakdown or was brought to an overcurrent state through an OSD display or the like, the user detaches the failed device from the downstream port 62 and re-connects it, followed by pushing of the reset switch 24, whereby the CPU 5 and hub 6 of the serial interface 2 can resume their operations from their initial states. When the overcurrent state is detected at this time, it is not necessary to disconnect the device connected to the downstream port 62 in particular.

Incidentally, the present embodiment has described the example in which the reset switch 24 is used as a trigger for resuming the operation from the overcurrent state. As an embodiment other than it, there is known a method of allowing the common reset circuit, CPU 5 or hub 6 to monitor an overcurrent state and automatically resuming the operation thereof from its initial state when the solution of the overcurrent state is detected.

Figure 24:
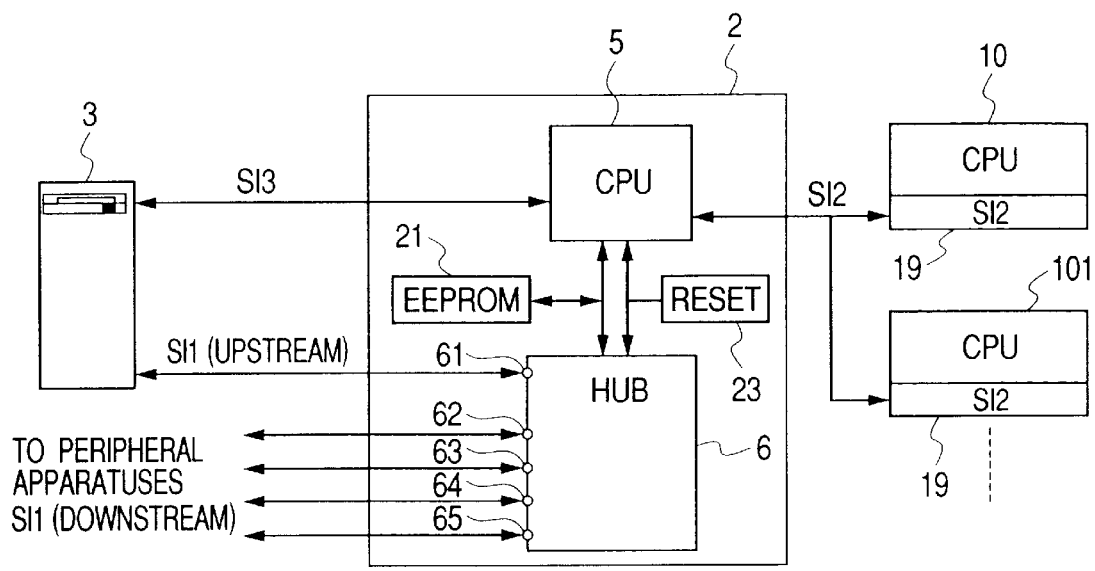
FIG. 24 is a diagram illustrating configurations of one embodiments of a display unit according to the present invention and a communication system using the display unit.

A still further embodiment of the present invention is shown in FIG. 24. In FIG. 24, the embodiment is one in which one serial interface adapter 2 performs control on communication with a plurality of displays and is different from other embodiments in that point.

The number of display units with which the serial interface adapter 2 according to the present embodiment is capable of communication, is not limited to one. The serial interface adapter 2 is able to communicate with a plurality of displays by assigning addresses every plural displays and identifying the same.

Figure 25:
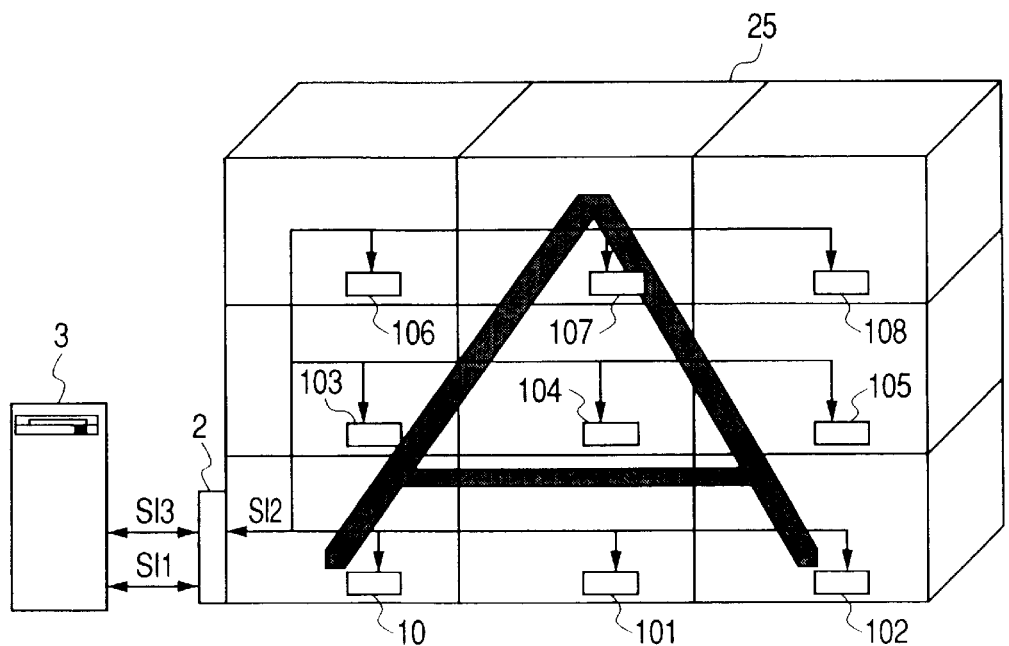
FIG. 25 is a diagram showing an example of a display screen on one embodiment in which a display unit according to the present invention is used in plural form.

A serial interface adapter is capable of performing control on communication with respective cores of a multiple-screen multi-display apparatus 25 wherein a plurality of display units shown in FIG. 25 by way of example, i.e., the three display units as viewed in upward and downward directions and three display units as viewed in left and right directions, or the nine display units in total are joined together to thereby implement one large screen. In FIG. 25, reference numerals 10, 101, 102, 103, 104, 105, 106, 107 and 108 indicate CPUs for controlling the display units used as the cores, respectively. The PC 3 is capable of performing image-quality control on the brightness, color temperatures, screen distortion, display sizes, positions every cores according to control on communication with CPUs of the respective cores. Further, the PC 3 is capable of obtaining adjustment values, identification information, performance information, etc. of the respective cores (display units) and performing control based on their data.

Figure 26:
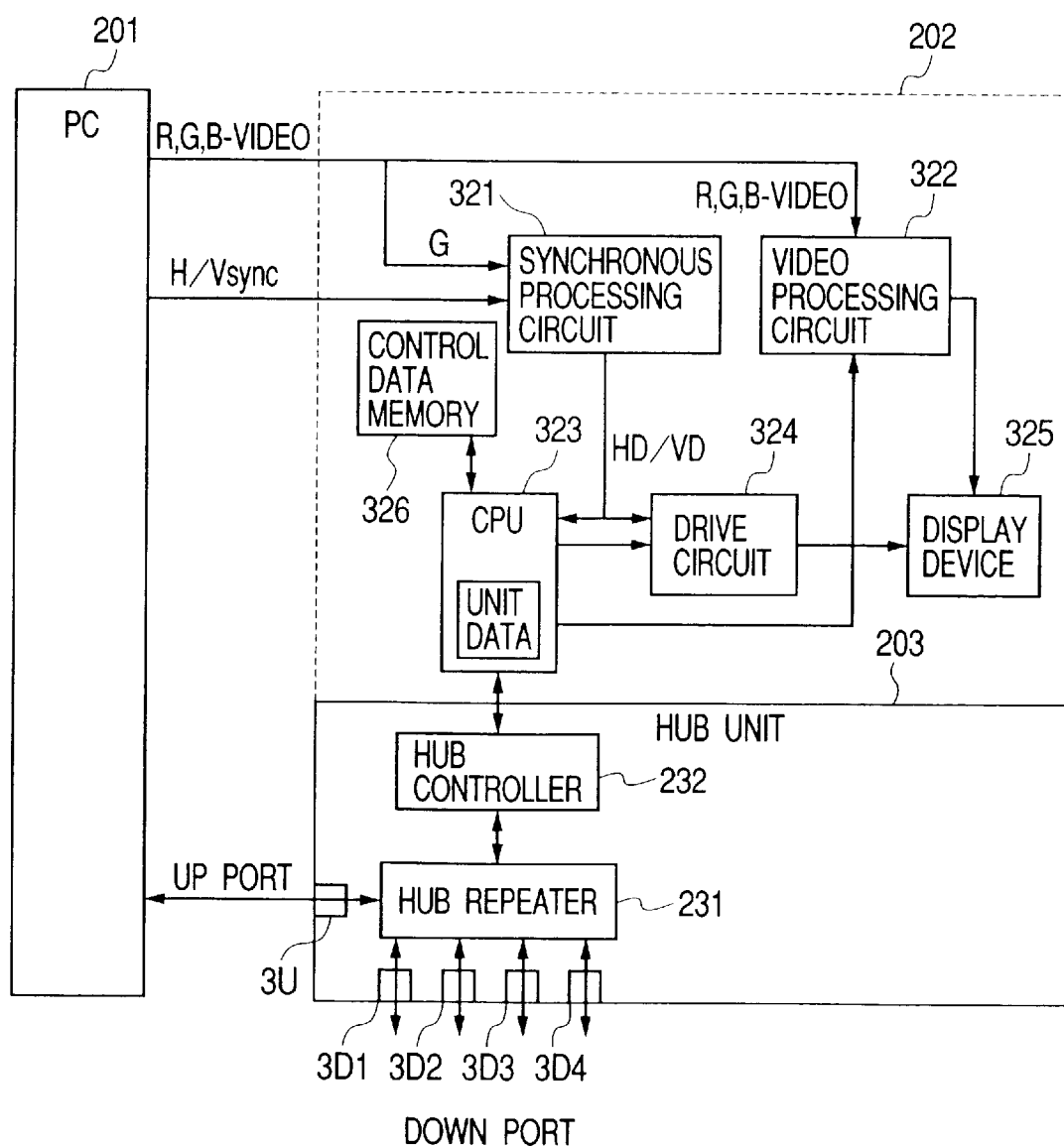
FIG. 26 is a diagram depicting one embodiment comprising a display unit according to the present invention, a computer and a system.

A block diagram showing a configuration of a display unit showing a still further embodiment of the present invention is shown in FIG. 26. In the same drawing, reference numeral 201 indicates a PC, reference numeral 202 indicates a display unit, and reference numeral 203 indicates a hub unit respectively. In the display unit 2, reference numeral 321 indicates asynchronous processing circuit, reference numeral 322 indicates a video processing circuit, reference numeral 323 indicates a CPU, reference numeral 324 indicates a drive circuit, reference numeral 325 indicates a display device, and reference numeral 326 indicates a control data memory, respectively. Operations of respective parts of the display unit 202 will be explained below.

The synchronous processing circuit 321 generates a horizontal pulse (HD) and a vertical pulse (VD) each having predetermined polarity from an input video signal, a complex synchronizing signal or HD and VD and supplies them to the video processing circuit 322, the CPU 323 and the drive circuit 324. At this time, the synchronous processing circuit 321 detects information about the polarity of the synchronizing signal and may supply it to the CPU 323. The CPU 323 specifies the input signal from the frequencies of the outputs HD and VD of the synchronous processing circuit 321 and the information about the polarity of the input synchronizing signal and invokes control data such as the brightness, color, display size, distortion, etc. used upon displaying the video signal from the control data memory 326 to thereby control the video processing circuit 322 and the drive circuit 324. Incidentally, while FIG. 26 shows the example in which the aforementioned control data memory 226 is provided outside the CPU 323, the present invention is not limited to it. For example, a ROM built in the CPU 323 may be used.

The video processing circuit 322 effects signal processing such as amplification, level shifting or the like on input video signals of R, G and B, based on control information sent from the CPU 323 and outputs the result of signal processing to the display device 325. The drive circuit 324 controls the display size, distortion, etc. based on the input synchronizing signals and the control information supplied from the CPU 323 and drives the display device 325. Owing to the operation of each part as described above, the input video signal can be displayed on the display device 325 as an image. Here, the display device 325 may be a CRT type, a liquid crystal type or a plasma type. Alternatively, any types may be used if they are devices each capable of displaying an image or characters thereon.

The operation of the hub unit 203 will be explained below. In the hub unit 203, reference numeral 3U indicates an UP port, reference numerals 3D1 through 3D4 indicate Down ports, reference numeral 231 indicates a hub repeater, and reference numeral 232 indicates a hub controller, respectively.

When the UP port 3U is connected to an external computer, the hub controller 232 acquires or obtains identification information such as the name of a maker, the name of a product, a production number thereof, version information about corresponding specifications, character information, power type information, the number of Down ports, an overcurrent detection type, a decision as to provision or support by a recovery signal from a holding state, a communication protocol, etc. supplied from the CPU 323 and replies to the external computer through the UP port, whereby the hub unit is recognized as a hub by the PC 201. Here, the identification information read from the CPU 323 may be read one by one from the CPU 323 every information requested from the PC 201. Alternatively, all necessary information may be read collectively before the connection of the UP port 3U.

Owing to the recognition of the hub unit 203 as the hub by the PC 201, the hub repeater starts the operation of intermediation communications between the UP port 3U and the Down ports 3D1 through 3D4, thereby bringing the Down ports 3D1 through 3D4 into an operable state. If peripheral apparatuses such as a keyboard, a mouse, etc. are connected to the Down ports 3D1 through 3D4 in this condition, then a communication with the PC 201 is enabled, so that the peripheral apparatuses connected to the Down ports 3D1 through 3D4 are capable of operation.

In the display unit 202 according to the present embodiment as described above, the CPU 323 holds the identification information such as the name of the maker for the hub unit 203, the name of its product, the production number thereof, etc. thereinside, and the hub unit 203 obtains the identification information from the CPU 323 and replies to the PC 201. As a result, the hub unit can be recognized by the PC 201 based on the identification information recorded inside the CPU 223.

When the display unit 202 supports or corresponds to a display control function for controlling the brightness, a display position, sizes, distortion, etc. from the PC 201, the display unit 202 records even the type of each control item referred to above, an adjustment range, etc. supported thereby in the CPU 323 and replies to the PC 201 via the hub unit 203. Consequently, the PC 201 is capable of grasping the effect that the display unit 202 corresponds to the display control function and specification information, whereby the display screen of the display unit 202 can be controlled. When display control information is sent from the UP port 3, the hub unit 203 transmits it to the CPU 323 lying within the display unit 202 through the hub controller 232, and hence the CPU 323 controls the video processing circuit 322 and the drive circuit 324 based on the received display control information. Thus, the PC 201 is capable of performing the display control of the display unit 202 and obtaining set values from the display unit 202.

Further, identification information for backup is provided inside the hub unit 203. When communications between the hub unit and the CPU 323 are not completed in this condition even if a predetermined time has elapsed, and the hub controller cannot obtain the identification information from the CPU 323 due to a communication protocol error, the hub unit 203 gives the backup information to the PC 201 as a replay and may operate as a general-purpose hub. Further, when the hub controller cannot obtain the identification information from the CPU 323 as described above, the adjustment items for the above display control function are limited and the display control function itself may be set so as to be prohibited.

Incidentally, the hub unit 203 may take either a unit structure wherein it is detachable from or attachable to the display unit 202 or incorporation of it into the display unit 202. The hub unit is exactly alike in that it has a hub control function for controlling communications between an external computer and each of peripheral apparatuses. Here, the peripheral apparatuses of course include the display unit 202 itself.

Figure 27:
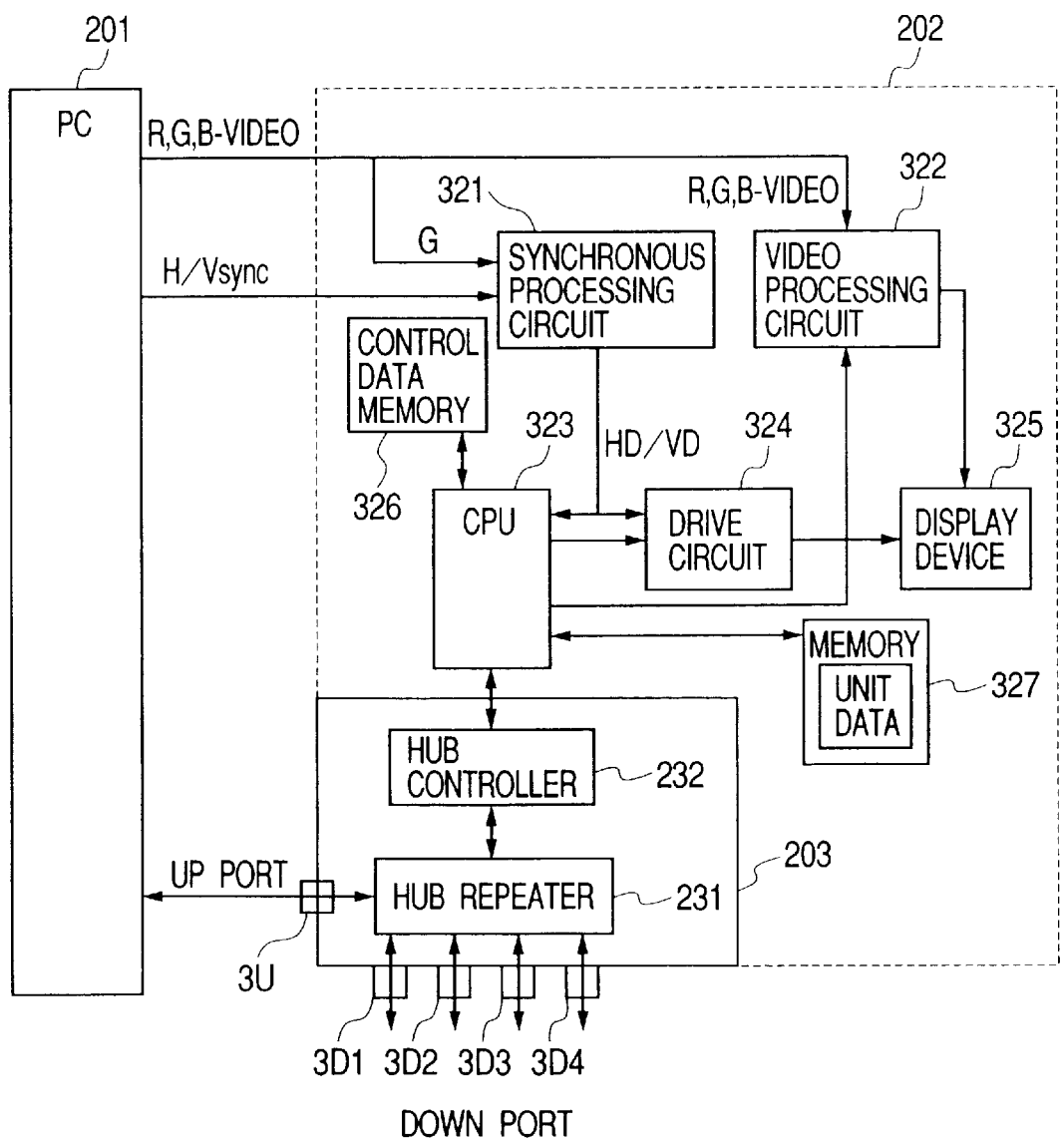
FIG. 27 is a diagram showing one embodiment comprising a display unit according to the present invention, a computer and a system.

A block diagram showing a configuration of a display unit corresponding to one embodiment of the present invention is shown in FIG. 27.

The same portions as those shown in FIG. 26 are identified by the same reference numerals and the description of certain common portions will therefore be omitted. The aforementioned embodiment has described the example in which the identification information of the hub unit 203 is recorded inside the CPU 323. In contrast to this, a description will be made of an example in which the display unit according to the present embodiment includes a memory 327 provided outside a CPU 323 and identification information of a hub unit 203 is recorded inside the memory 327.

The CPU 323 obtains the identification information of the hub unit 203 from the memory 327 and transmits it to the hub unit 203. Incidentally, the interface between the CPU 323 and the memory 327 may be set either serially or in parallel. In the case of the serial interface, a two-line type using two signal lines comprising one clock line and one bidirectional data line may be used. Alternatively, a three-line type using three signal lines comprising one clock line, one transmitting data line and one receiving data line may be used. While the present embodiment has described the example in which the memory 327 is provided as a dedicated memory circuit for recording the identification information of the hub unit 203, the present invention is not limited to it. The identification information of the hub unit 203 may be recorded in a memory 326. Even this case doe not depart from the scope of the present invention.

Figure 28:
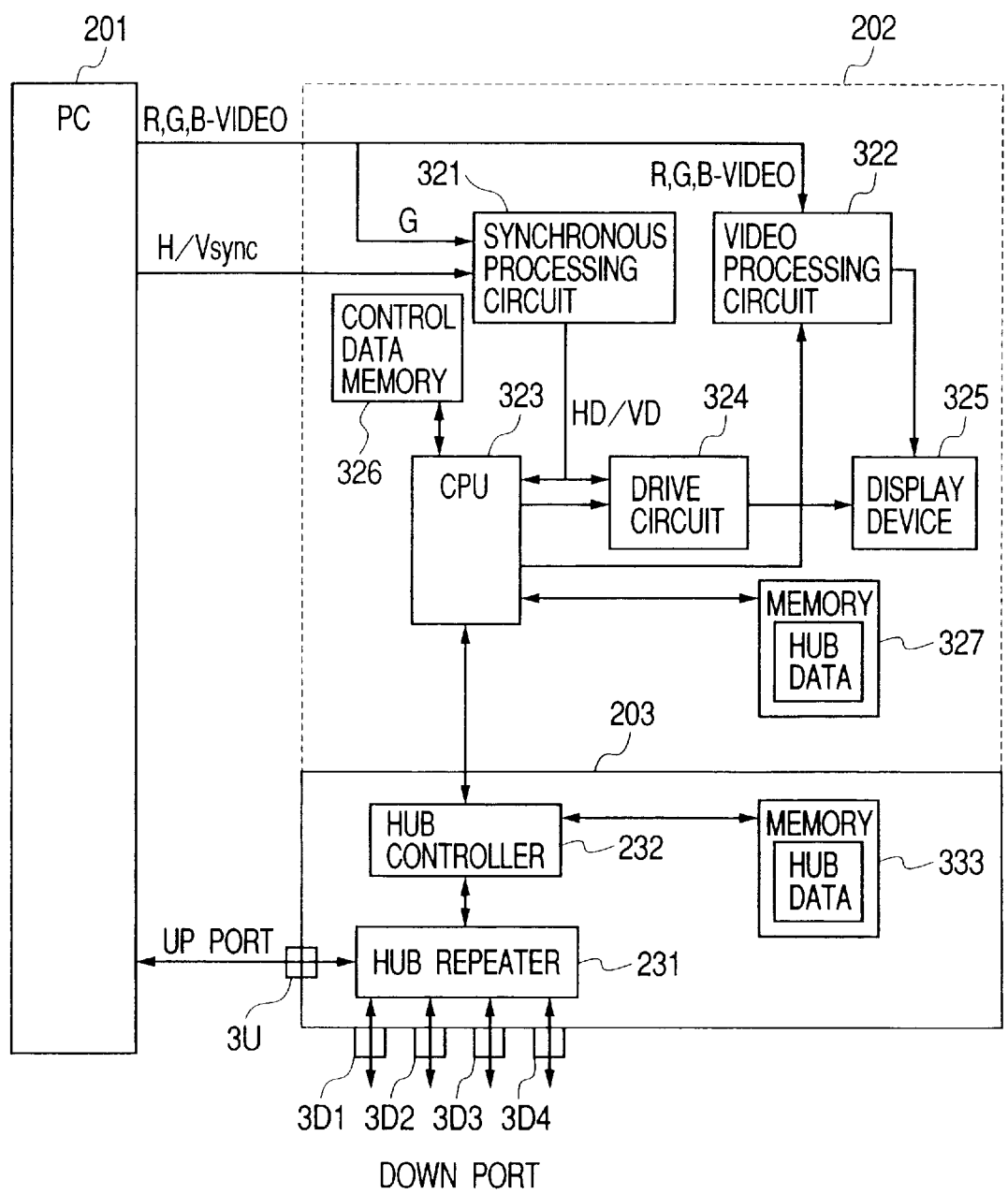
FIG. 28 is a diagram illustrating one embodiment comprising a display unit according to the present invention, a computer and a system.

A block diagram showing a configuration of a display unit illustrative of one embodiment according to the present invention is shown in FIG. 28.

The same portions as those shown in FIG. 26 are identified by the same reference numerals and the description of certain common portions will therefore be omitted. The aforementioned embodiment has described the example in which the data of the hub unit is read from only the memory 327 provided inside the display unit 202. In contrast with it, a display unit 202 according to the present embodiment differs from the aforementioned embodiment in that a second memory 333 is provided inside a hub unit 203, and a selection as to in which memory area data should be recorded according to the contents of data, is made and the data is recorded in the selected memory area.

It is desirable that since the production number of the hub unit 203 is a value inherent in the hub unit 203, for example, it is recorded in the memory 333 provided within the hub unit 203. In such a case, the hub unit 203 employed in the present embodiment may be set in such a manner that the name of a maker therefor makes use of information stored in the memory 327 and the production number thereof makes use of information stored in the memory 333. When the production number of the hub unit 203 is received from the memory 333 even if the production number of the hub unit 203 is received from the memory 327, the information stored in the memory 333 is given priority, for example, or priorities may be provided according to items of information. Further, when the information in the memory 333 is missed, the information stored in the memory 327 supplements its miss, for example, and the data stored in the memory 327 may be used as backup. Furthermore, when the data cannot be read from both memories, backup data lying inside a hub controller 232 is used as second backup data, for example, or priorities may be provided for the backup data.

Figure 29:
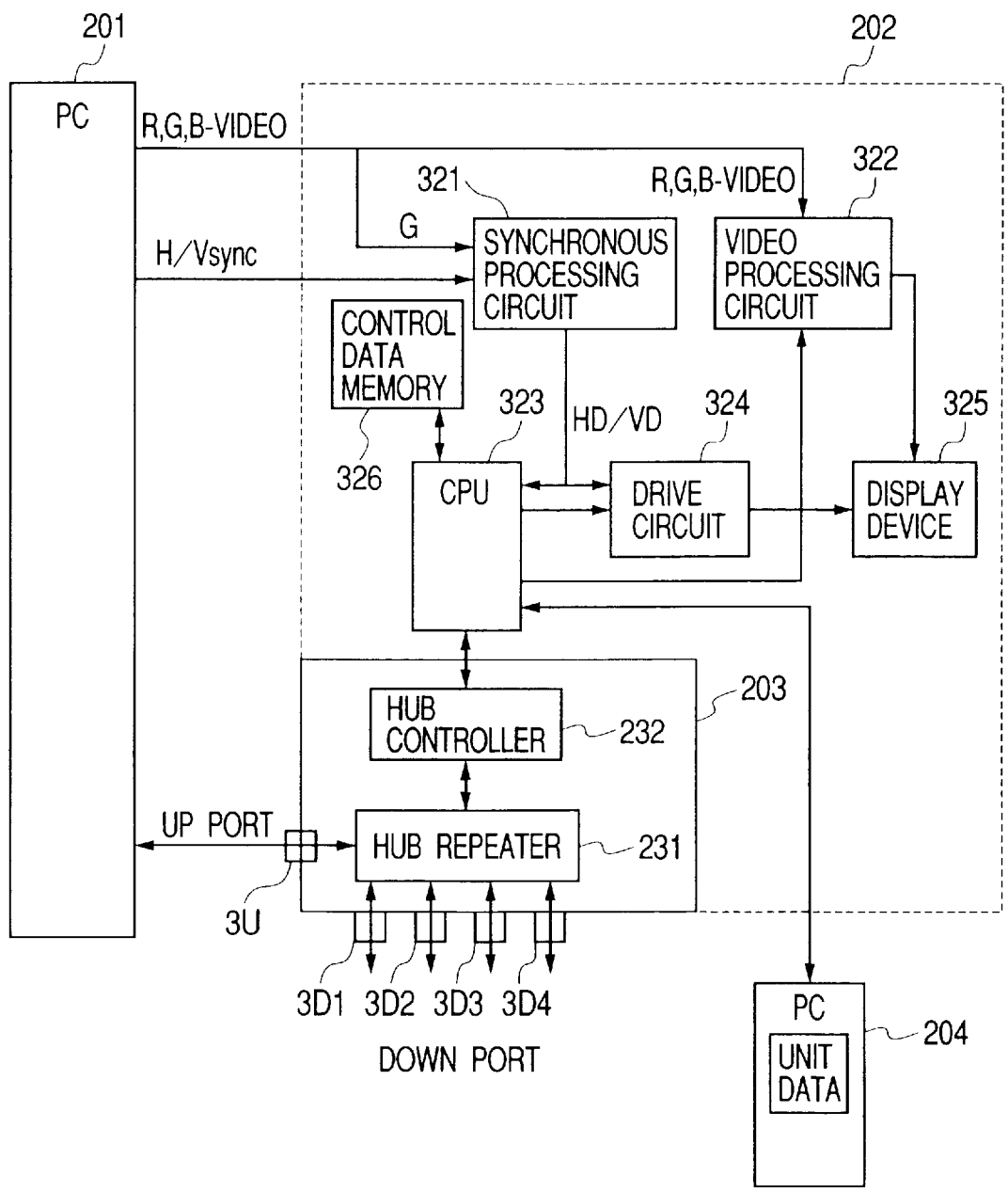
FIG. 29 is a diagram depicting one embodiment comprising a display unit according to the present invention, a computer, and a system.

A block diagram showing a configuration of a display unit corresponding to one embodiment of the present invention is shown in FIG. 29.

In the same drawing, reference numeral 204 indicates a second PC. The same portions as those shown in FIG. 26 are identified by the same reference numerals and the description of certain common portions will therefore be omitted. The aforementioned embodiment has described the example in which the hub unit is provided inside the display unit 202. On the other hand, the present embodiment differs from the aforementioned embodiment in that the second PC 204 different from the PC 201 is provided and a hub controller 232 obtains identification information from the PC 204 through a CPU 323.

Since it is not necessary to perform the working of wiring identification data into a memory 327 upon verifying operation at production in the present embodiment, the time-based manufacturing cost can be reduced. The interface between the CPU 323 and the PC 204 may be set either serially or in parallel. In the case of the serial interface, the aforementioned two-line type or three-line type may be used, or a UART (Universal Asynchronous Receiver/Transmitter) may be used.

Incidentally, the present embodiment has described the example in which the hub controller 232 obtains the identification information from the PC 204 through the CPU 323. However, the present invention is not limited to it. Even when the hub controller 232 obtains the identification information directly from the PC 204, it does not depart from the scope of the present invention. As the interface between the hub unit 203 and the PC 204 in this case, any of the aforementioned various interfaces may be used.

Figure 30:
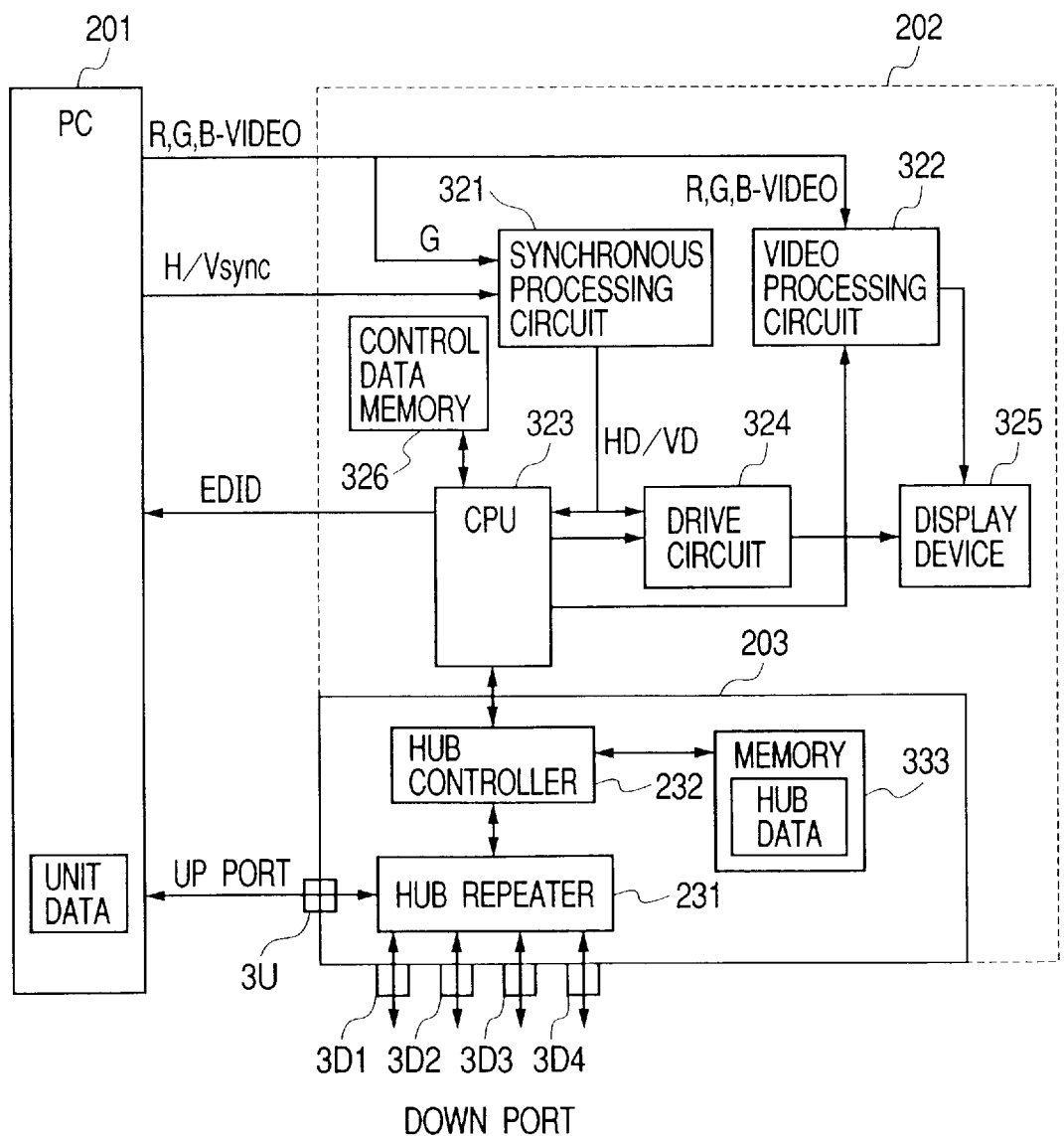
FIG. 30 is a diagram showing one embodiment comprising a display unit according to the present invention, a computer and a system.

A block diagram showing a configuration of a display unit corresponding to one embodiment of the present invention is shown in FIG. 30.

The same portions as those shown in FIG. 26 are identified by the same reference numerals and the description of certain common portions will therefore be omitted. The aforementioned embodiment has described the example in which the hub controller 232 obtains the identification information from the second PC 204. On the other hand, the present embodiment differs from the aforementioned embodiment in that identification information from a PC 201 is obtained.

When, for example, the PC 201 has failed to obtain the corresponding identification information from the hub unit 203, it receives identification information defined as for the display unit, e.g., EDID (Extended Display Identification Data) from a CPU 323, extracts identification information about the hub unit 203 installed in the display unit 202 from EDID, and transmits it to a hub controller 232 through an UP port 3U. The hub controller 232 writes the identification information received from the PC 201 into its corresponding memory 333 provided within the hub unit 203. Subsequently, the hub controller 232 gives the identification information of the memory 333 to the PC 201 as a reply to the PC 201 to thereby be able to operate as a Hub Device. Owing to the use of a non-volatile memory device as the memory 333, the second or later writing of identification information therein can be omitted. Owing to the operation of each part as described above, the hub unit 203 is capable of obtaining the identification information from the PC 201 and operation.

Incidentally, the present embodiment has described the example in which the hub unit 203 obtains the identification information through the UP port 3U. However, the present invention is not limited to it. Even when the CPU 323 makes use of an interface through which EDID is transmitted, and it is received from the PC 1 through the CPU 323, this does not depart from the scope of the present invention. A storage area for the EDID may be provided either inside the CPU 323 or inside a control data memory 326. Alternatively, a dedicated memory circuit may be provided anew. Further, the dedicated memory circuit may take a configuration wherein it is connected to an interface between the PC 201 and the CPU 323 and the PC 201 directly reads data without being via the CPU 323.

The embodiments have been shown and described every items of the present invention to make it easy to understand the above description. Thus, even if the respective embodiments described in the present specification are utilized in any combinations, they do not depart from the scope of the present invention. Further, the display device is not necessarily limited to the CRT and may be a matrix type like a liquid crystal type or a plasma type.

INDUSTRIAL APPLICABILITY

According to the present invention as described above, a flexibly-compatible display unit can be provided even if specifications for interface to a PC are changed. Apparatuses capable of performing mutual conversion based on interface specifications can be provided for communications between commonly-used digital signal processing devices or apparatuses different in interface specifications from each other.

Since a hub unit, which communicates with a PC, obtains identification information necessary as a hub, such as the name of a maker thereof, a production number thereof, etc. from a display unit, it can be activated as a hub unit having identification information held at unity with the display unit.

Further, since the hub unit can obtain image-quality adjustment items and an adjustment range handled or supported by the display unit from the display unit and give a reply to the PC, all adjustment items operable by the display unit can be adjusted by the PC in predetermined amounts.

What is claimed is:

1. A display unit, comprising:

a video processing circuit to which video signals of R, G and B are inputted;

a display device for performing a display based on the output of said video processing circuit;

a drive circuit for driving said display device based on synchronizing signals inputted thereto together with said video signals;

a CPU circuit for controlling said video processing circuit and said drive circuit;

a hub unit which includes a hub controller for connecting peripheral apparatuses to an external computer; and a memory which holds means for holing all or part of identification information regarding said hub unit, which is transmitted through said hub controller to said external computer, said memory being provided inside said display unit at a location other than said hub unit.

2. A display unit as claimed in claim 1, wherein the identification information includes at least a manufacturer and a character or code for identifying a product.

3. A display unit as claimed in claim 1, wherein said memory is provided inside said CPU circuit.

4. A display unit as claimed in claim 1, wherein backup information used when a failure to obtain said identification information from said memory occurs, is provided inside said hub unit.

5. A display unit, comprising:

a video processing circuit to which video signals of R, G and B are inputted;

a display device for performing a display based on the output of said video processing circuit;

a drive circuit for driving said display device based on synchronizing signals inputted thereto together with said video signals;

a CPU for controlling said video processing circuit and said drive circuit;

a hub unit which includes a hub controller for connecting peripheral apparatuses to an external computer;

a first memory which holds all or part of identification information indicative principally of the hub unit, which is transmitted through said hub controller to said external computer, said first memory being provided inside said display unit other than said hub unit; and a second memory which holds all or part of identification information indicative principally of said hub unit, which is transmitted through said hub controller to said external computer, said second memory being provided inside said hub unit.

6. A display unit as claimed in claim 5, wherein the information held in the second memory takes precedence over the information held in said first memory.

7. A display unit as claimed in claim 5, wherein the identification information includes at least a manufacturer and a character or code for identifying a product.

8. A display unit as claimed in claim 5, wherein said first memory is provided inside said CPU circuit.

9. A display unit as claimed in claim 5, wherein backup information used when a failure to obtain said identification information from said first memory occurs, is provided inside said second memory of said hub unit.

10. A display unit, comprising:
   a video processing circuit to which video signals of R, G and B are inputted;
   a display device for performing a display based on the output of said video processing circuit;
   a drive circuit for driving said display device based on synchronizing signals inputted thereto together with said video signals;
   a CPU for controlling said video processing circuit and said drive circuit;
   an external computer for connecting peripheral apparatuses;
   a hub unit which includes a hub controller connected to said external computer; and
   a memory which holds all or part of identification information regarding said hub unit, which is transmitted through said hub controller to the external computer, said memory being provided inside said external computer.

11. A display unit as claimed in claim 10, wherein the identification information includes at least a manufacturer and a character or code for identifying a product.

12. A display unit as claimed in claim 10, wherein said memory is provided inside a CPU circuit.

13. A display unit as claimed in claim 10, wherein backup information used when a failure to obtain said identification information from said memory occurs, is provided inside a backup memory of said hub unit.

14. A system comprising:
   at least one item selected from a list of: a personal computer, PCB, bus portion, input device, output device, power supply arrangement and case; and
   a display unit, including:
      a video processing circuit to which video signals of R, G and B are inputted;
      a display device for performing a display based on the output of said video processing circuit;
      a drive circuit for driving said display device based on synchronizing signals inputted thereto together with said video signals;
      a CPU circuit for controlling said video processing circuit and said drive circuit;
      a hub unit which includes a hub controller for connecting peripheral apparatuses to an external computer; and
      a memory which holds all or part of identification information regarding said hub unit, which is transmitted through said hub controller to said external computer, said memory being provided inside said display unit at a location other than said hub unit.

15. A system as claimed in claim 14, wherein the identification information includes at least a manufacturer and a character or code for identifying a product.

16. A system as claimed in claim 14, wherein said memory is provided inside said CPU circuit.

17. A system as claimed in claim 14, wherein backup information used when a failure to obtain said identification information from said memory occurs, is provided inside said hub unit.

18. A system comprising:
   at least one item selected from a list of: a personal computer, PCB, bus portion, input device, output device, power supply arrangement and case; and
   a display unit, including:
      a video processing circuit to which video signals of R, G and B are inputted;
      a display device for performing a display based on the output of said video processing circuit;
      a drive circuit for driving said display device based on synchronizing signals inputted thereto together with said video signals;
      a CPU for controlling said video processing circuit and said drive circuit;
      a hub unit which includes a hub controller for connecting peripheral apparatuses to an external computer;
      a first memory which holds all or part of identification information indicative principally of the hub unit, which is transmitted through said hub controller to said external computer, said first memory being provided inside said display unit other than said hub unit; and
      a second memory which holds all or part of identification information indicative principally of said hub unit, which is transmitted through said hub controller to said external computer, said second memory being provided inside said hub unit.

19. A system as claimed in claim 18, wherein the information held in the second memory takes precedence over the information held in said first memory.

20. A system as claimed in claim 18, wherein the identification information includes at least a manufacturer and a character or code for identifying a product.

21. A system as claimed in claim 18, wherein said first memory is provided inside said CPU circuit.

22. A system as claimed in claim 18, wherein backup information used when a failure to obtain said identification information from said first memory occurs, is provided inside said second memory of said hub unit.

23. A system comprising:
   at least one item selected from a list of: a personal computer, PCB, bus portion, input device, output device, power supply arrangement and case; and
   a display unit, including:
      a video processing circuit to which video signals of R, G and B are inputted;
      a display device for performing a display based on the output of said video processing circuit;
      a drive circuit for driving said display device based on synchronizing signals inputted thereto together with said video signals;
      a CPU for controlling said video processing circuit and said drive circuit;
      an external computer for connecting peripheral apparatuses;
      a hub unit which includes a hub controller connected to said external computer; and
      a memory which holds all or part of identification information regarding said hub unit, which is transmitted through said hub controller to the external computer, said memory being provided inside said external computer.

24. A system as claimed in claim 23, wherein the identification information includes at least a manufacturer and a character or code for identifying a product.

25. A system as claimed in claim 23, wherein said memory is provided inside a CPU circuit.

26. A system as claimed in claim 23, wherein backup information used when a failure to obtain said identification information from said memory occurs, is provided inside a backup memory of said hub unit.

* * * * *